US010768436B2

(12) United States Patent
Nagaoka et al.

(10) Patent No.: US 10,768,436 B2
(45) Date of Patent: Sep. 8, 2020

(54) IMAGE SHAKE CORRECTION UNIT, LENS APPARATUS USING THE SAME, AND IMAGE PICKUP APPARATUS

(71) Applicant: CANON KABUSHIKI KAISHA, Tokyo (JP)

(72) Inventors: Nobuyuki Nagaoka, Utsunomiya (JP); Makoto Hayakawa, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 125 days.

(21) Appl. No.: 15/847,782

(22) Filed: Dec. 19, 2017

(65) Prior Publication Data

US 2018/0180899 A1 Jun. 28, 2018

(30) Foreign Application Priority Data

Dec. 27, 2016 (JP) ................................ 2016-254217

(51) Int. Cl.
*G02B 27/64* (2006.01)
*H02K 41/035* (2006.01)

(52) U.S. Cl.
CPC ....... *G02B 27/646* (2013.01); *H02K 41/0356* (2013.01)

(58) Field of Classification Search
CPC ... H02K 41/0356; G02B 27/646; G02B 27/64
USPC ....................................................... 359/557
See application file for complete search history.

(56) References Cited

U.S. PATENT DOCUMENTS

| 7,689,109 | B2 | 3/2010 | Noguchi | |
|---|---|---|---|---|
| 8,086,097 | B2 | 12/2011 | Sato | |
| 8,218,958 | B2 | 7/2012 | Sato | |
| 8,558,898 | B2 | 10/2013 | Kanda | |
| 9,436,017 | B2* | 9/2016 | Sato | ..................... G02B 27/646 |
| 2001/0014213 | A1* | 8/2001 | Terada | ..................... G03B 5/00 |
| | | | | 396/55 |
| 2006/0093339 | A1* | 5/2006 | Umezu | ..................... G03B 17/02 |
| | | | | 396/55 |
| 2006/0181632 | A1* | 8/2006 | Makii | ..................... G02B 7/02 |
| | | | | 348/335 |
| 2011/0013283 | A1* | 1/2011 | Sato | ..................... G02B 27/646 |
| | | | | 359/557 |
| 2011/0249336 | A1* | 10/2011 | Sato | ..................... G02B 27/646 |
| | | | | 359/557 |

(Continued)

FOREIGN PATENT DOCUMENTS

JP 2012-168398 A 9/2012
JP 2013-3332 A 1/2013

*Primary Examiner* — William R Alexander
(74) *Attorney, Agent, or Firm* — Canon U.S.A., Inc., IP Division

(57) ABSTRACT

An image shake correction unit includes a base member, a yoke, a lens holding member, a driving unit, a rotation suppression unit configured to restrict rotation of the lens holding member around an optical axis of the lens unit, and a biasing member configured to bias the lens holding member toward the base member in a direction of the optical axis. The driving unit and the rotation suppression unit are disposed to satisfy a predetermined condition in a case where the image shake correction unit is viewed from the direction of the optical axis. Further, the biasing member has one end provided on the rotation suppression unit and the other end provided on the base member.

20 Claims, 19 Drawing Sheets

(56) References Cited

U.S. PATENT DOCUMENTS

2012/0120492 A1* 5/2012 Sato .................... G02B 27/646
    359/557
2017/0118411 A1* 4/2017 Morinaga .......... H04N 5/23287

* cited by examiner

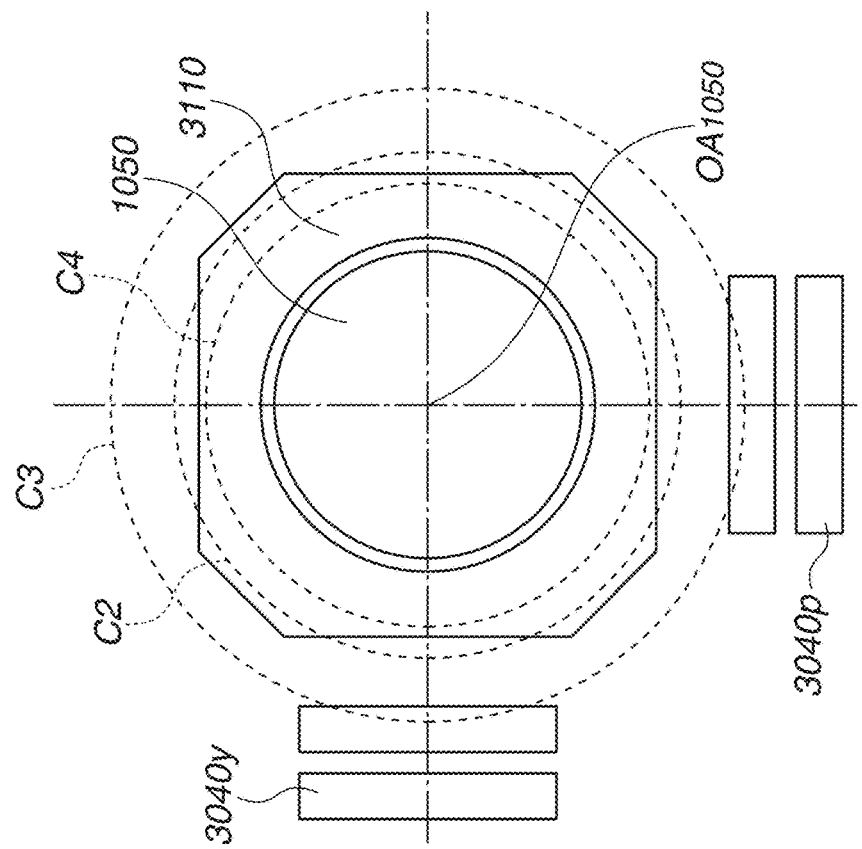
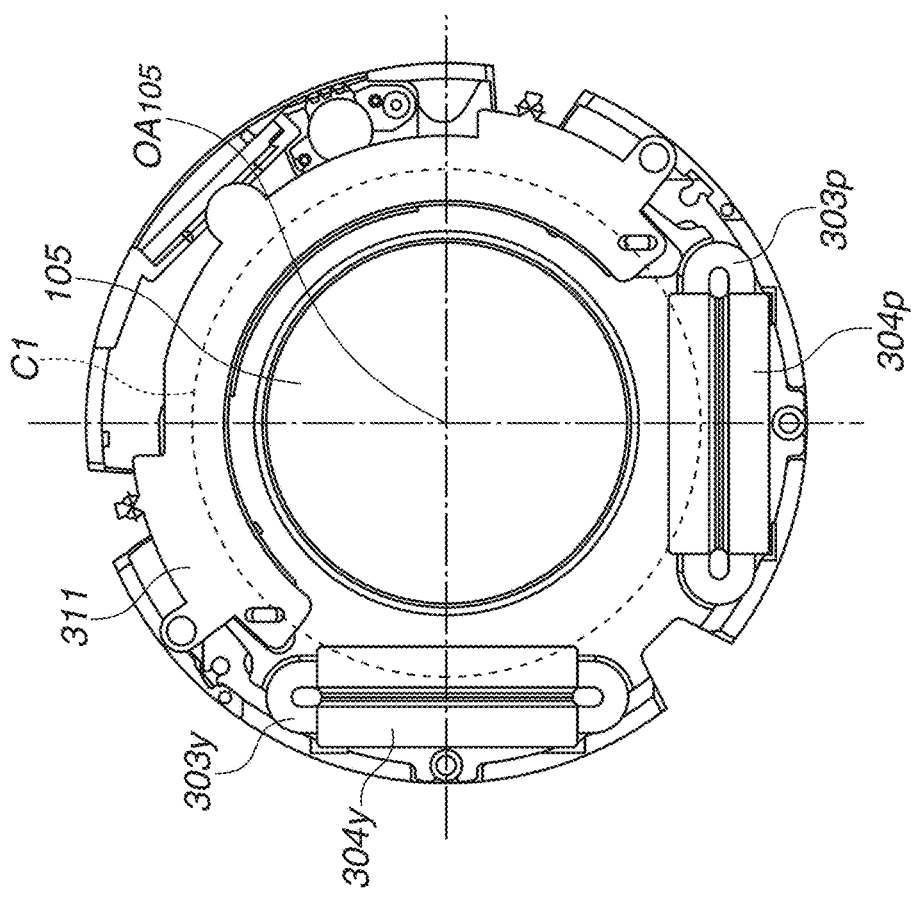
FIG. 14A
FIG. 14B

CROSS-SECTIONAL VIEW B

IMAGE SHAKE CORRECTION UNIT, LENS APPARATUS USING THE SAME, AND IMAGE PICKUP APPARATUS

BACKGROUND OF THE INVENTION

Field of the Invention

The present disclosure relates to an image shake correction unit, a lens apparatus using the image shake correction unit, and an image pickup apparatus using the image shake correction unit.

Description of the Related Art

An image shake correction unit that can correct influence caused by camera shake is mounted on a lens apparatus such as an interchangeable lens or an image pickup apparatus such as a video camera and a digital camera in some models. A typical image shake correction unit include an image shake correction lens and an electromagnetic actuator as a driving unit to move the image shake correction lens in a direction orthogonal to an optical axis. The electromagnetic actuator uses a magnet and a coil. If the image shake correction lens rotates around the optical axis in the image shake correction unit, it becomes difficult to accurately move the image shake correction lens by the electromagnetic actuator described above.

An image shake correction unit discussed in U.S. Pat. No. 7,689,109 uses a shift barrel holding the image shake correction lens and a rolling prevention member movable in a first direction orthogonal to the optical axis, and adopts a configuration in which the shift barrel is movable in a second direction orthogonal to the optical axis with respect to the rolling prevention member. Such a configuration can prevent the image shake correction lens from rotating around the optical axis in the image shake correction unit.

When the image shake correction unit discussed in U.S. Pat. No. 7,689,109 is viewed from the optical axis direction of the image shake correction lens, the electromagnetic actuator is disposed outside the annular rolling prevention member. Therefore, if the electromagnetic actuator is further brought close to the optical axis of the image shake correction lens to downsize the image shake correction unit in the radial direction, the electromagnetic actuator and the annular rolling prevention member interfere each other.

SUMMARY OF THE INVENTION

The present disclosure is directed to an image shake correction unit that is downsized as compared with the existing image shake correction unit while preventing rotation of the image shake correction lens unit around the optical axis, and a lens apparatus and an image pickup apparatus each using the image shake correction unit.

An image shake correction unit according to the present disclosure includes a base member, a yoke, a lens holding member that holds a lens unit and is movable in a direction orthogonal to an optical axis of the lens unit, a driving unit configured to move the lens holding member in the direction orthogonal to the optical axis, a rotation suppression unit that is provided on a side opposite to a side of the base member relative to the lens holding member, and is configured to suppress rotation of the lens holding member around the optical axis, and a biasing member configured to bias the lens holding member toward the base member in a direction of the optical axis, in which the driving unit and the rotation suppression unit are disposed such that at least a part of the driving unit and at least a part of the rotation suppression unit are located on a circumference of a circle that has a predetermined radius centering on the optical axis in a case where the image shake correction unit is viewed from the direction of the optical axis, and the biasing member has one end provided on the rotation suppression unit and the other end provided on the base member.

Further features of the present disclosure will become apparent from the following description of exemplary embodiments with reference to the attached drawings.

BRIEF DESCRIPTION OF THE DRAWINGS

FIGS. 14A and 14B are diagrams each illustrating positional relationship between a driving unit and a rotation suppression unit.

Figure 1:
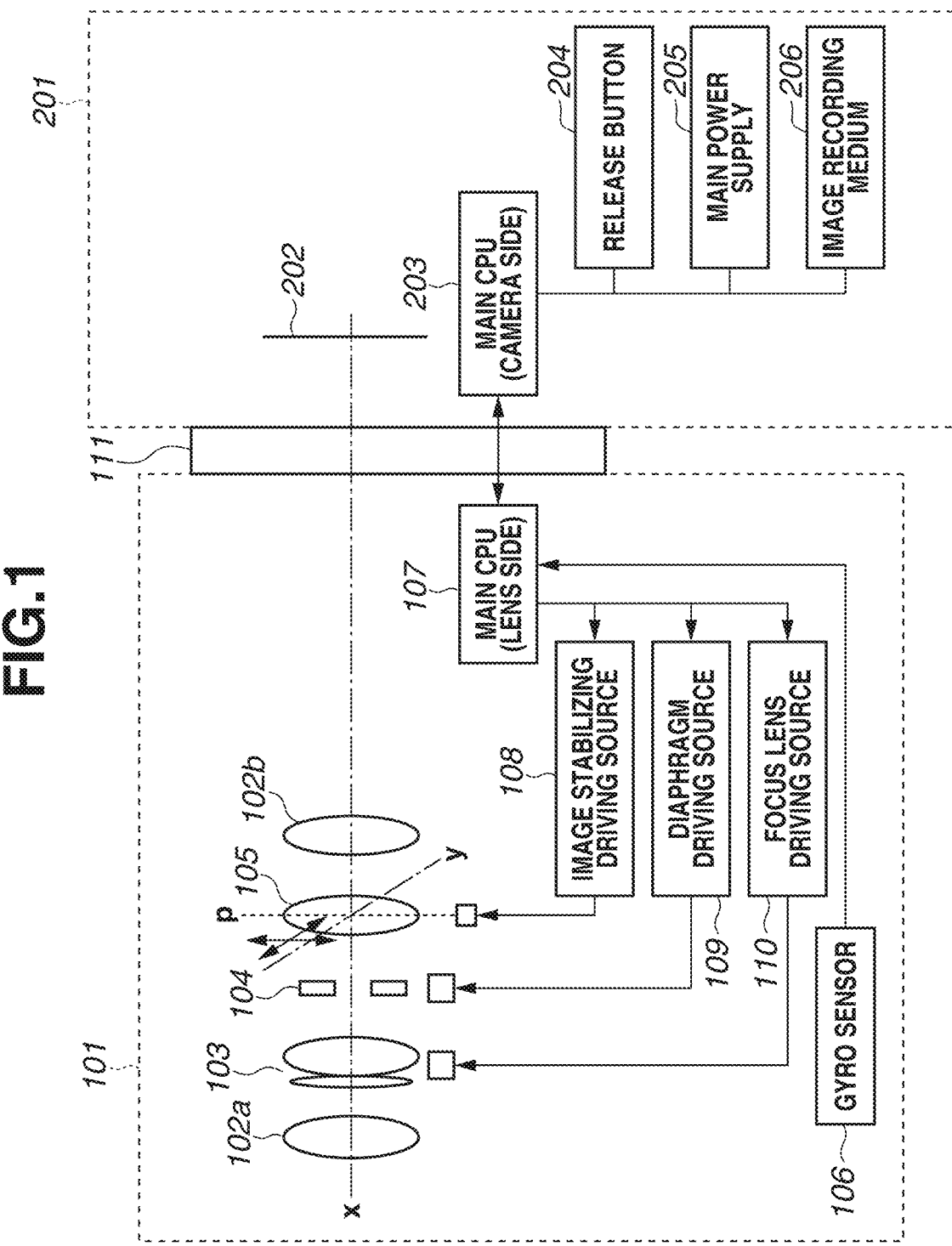
FIG. 1 is a diagram illustrating an image pickup apparatus including a lens unit and a camera body.

DESCRIPTION OF THE EMBODIMENTS (Configuration of Lens Apparatus and Image Pickup Apparatus)

A configuration of an image pickup apparatus that includes a lens apparatus 101 using an image shake correction unit illustrated in each exemplary embodiment of the present disclosure, and a camera body 201 to which the lens apparatus 101 is attachable is described with reference to FIG. 1.

(Configuration of Lens Apparatus)

The lens apparatus 101 that is an interchangeable lens includes fixed lens units 102a and 102b and a focusing lens unit 103. The fixed lens units 102a and 102b does not move in adjusting the focus of a lens. The focus lens unit 103 moves in an x axis direction that is an optical axis direction of the lens apparatus 101, in focusing. The lens unit used herein represents one lens and a lens group that is a group of a plurality of lenses.

The lens apparatus 101 further includes a diaphragm unit 104 and an image shake correction lens unit 105. The image shake correction lens unit 105 is movable in a p direction (pitch direction or first direction) and a y direction (yaw direction or second direction) that are orthogonal to the x direction as the optical axis direction, in order to correct image blur caused by camera shake. Here, a case where the direction is orthogonal to the optical axis direction (or in-plane orthogonal to the optical axis), includes a case where the direction is displaced within a range of an allowable margin from a completely orthogonal direction, or the direction is substantially orthogonal to the optical axis direction, in addition to a case where the direction is fully orthogonal to the optical axis. More specifically, in a case where an angle formed with respect to the optical axis direction is within three degrees, the direction may be regarded as the direction orthogonal to the optical axis.

The lens apparatus 101 may further include a zoom lens unit that moves in the x axis direction in zooming, in addition to the above lens units and the diaphragm unit. In this case, the fixed lens units 102a and 102b do not move in zooming. In addition, these lens units and the diaphragm unit are held by a lens barrel not illustrated in FIG. 1.

A subscript p of each reference numeral indicates a component that is used to correct an image blur caused by rotational shake in the p direction or to detect a position in the p direction. Likewise, a subscript y indicates a component that is used to correct an image blur caused by rotational shake in the y direction and to detect a position in the y direction.

The lens apparatus 101 further includes a gyro sensor 106 serving as a shake detection unit, a main central processing unit (CPU) 107 that controls each driving source described below and performs calculation, and driving sources that drive the lens units and the diaphragm unit. More specifically, the lens apparatus 101 includes an image shake correction driving source 108 that drives the image shake correction lens unit 105, and a diaphragm driving source 109 that drives the diaphragm unit 104. Further, the lens apparatus 101 includes a focus lens driving source 110 that drives the focus lens unit 103.

To perform image shake correction control, the main CPU 107 uses a detection value of the gyro sensor 106 to calculate an image shake correction amount, and transmits an instruction to the image shake correction driving source 108. As a result, the image shake correction lens unit 105 is driven in the p direction and the y direction, which results in the image shake correction. In other words, the image shake correction lens unit 105 and the image shake correction driving source 108 function as image shake correction unit. In addition, the main CPU 107 includes a determination unit that determines an attitude of the lens apparatus 101 or the camera body 201 from the detection value of the gyro sensor 106.

The lens apparatus 101 is fixed to the camera body 201 through a mount 111. The lens apparatus 101 forms an image of an object on an image sensor 202 through the lens units and the diaphragm unit 104, thereby imaging the object. The image sensor 202 is held by the camera body 201 and receives light from the lens apparatus 101.

(Configuration of Camera Body 201)

The camera body 201 includes the above-described image sensor 202, a main CPU 203, a release button 204 of an operation member, a main power supply 205, and an image recording medium 206. The release button 204 is configured to perform two stage pressing, and a first stage is referred to as SW1, and a second stage is referred to as SW2. The SW1 gives an instruction to prepare for shooting start, such as returning from shooting standby, start of image shake correction, start of autofocusing, and start of photometry, is performed. The SW2 gives an instruction to capture an image and to record the image in the image recording medium 206. In addition, power supply from the main power supply 205 to the lens apparatus 101 and exchange of shooting information between the main CPUs 107 and 203 are performed through contact blocks provided on the mount 111 (not illustrated).

As described above, the image pickup apparatus illustrated in FIG. 1 includes the lens apparatus 101 as the interchangeable lens and the camera body 201. However, the image shake correction unit described in each of the exemplary embodiments of the present disclosure may also be applied to a digital video camera and a compact digital camera in which the lens apparatus 101 and the camera body 201 are integrated.

(Configuration of Image Stabilization Unit 300)

Figure 2:
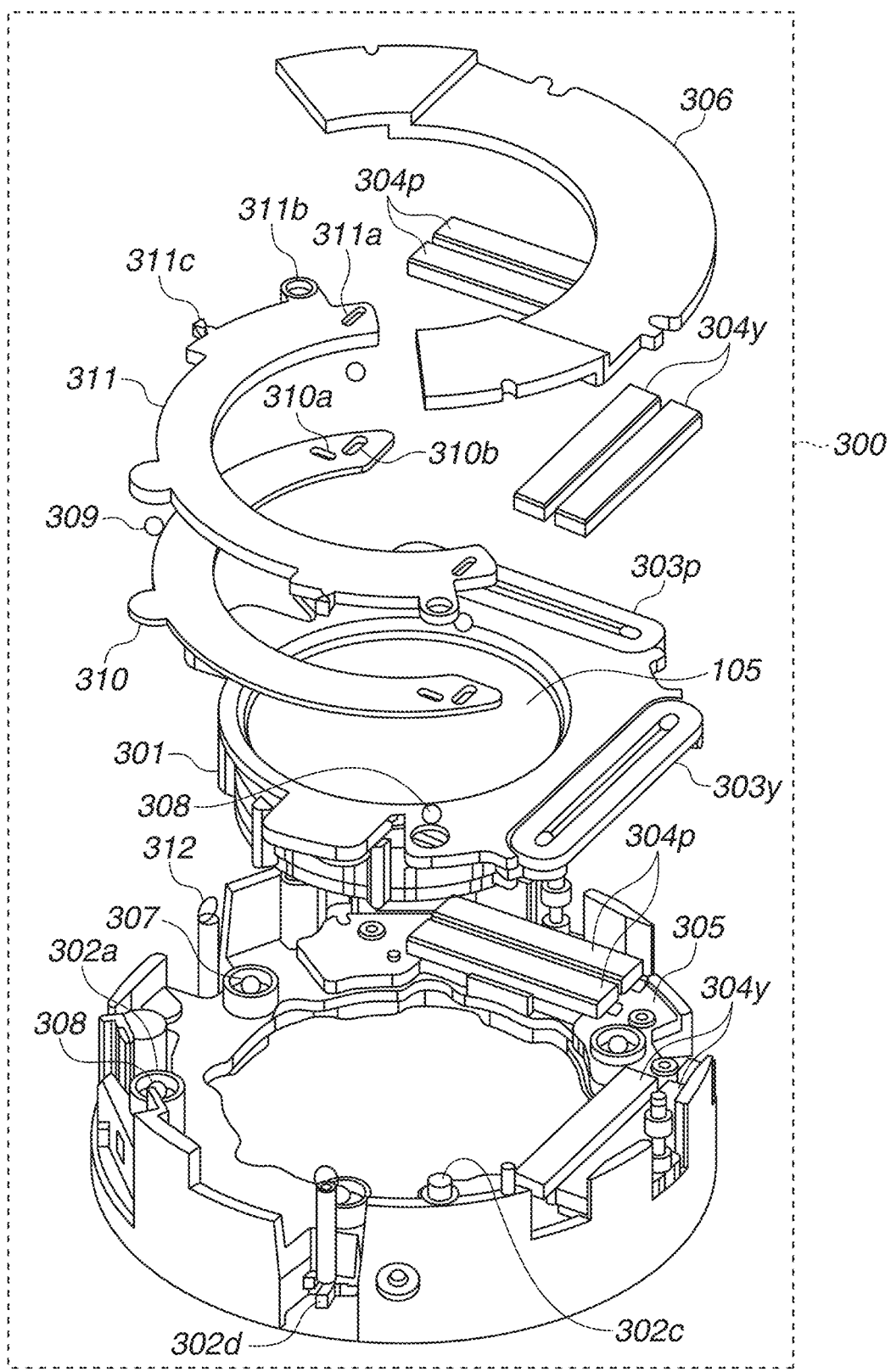
FIG. 2 is an exploded perspective view of an image stabilization unit in a first exemplary embodiment.
Figure 3:
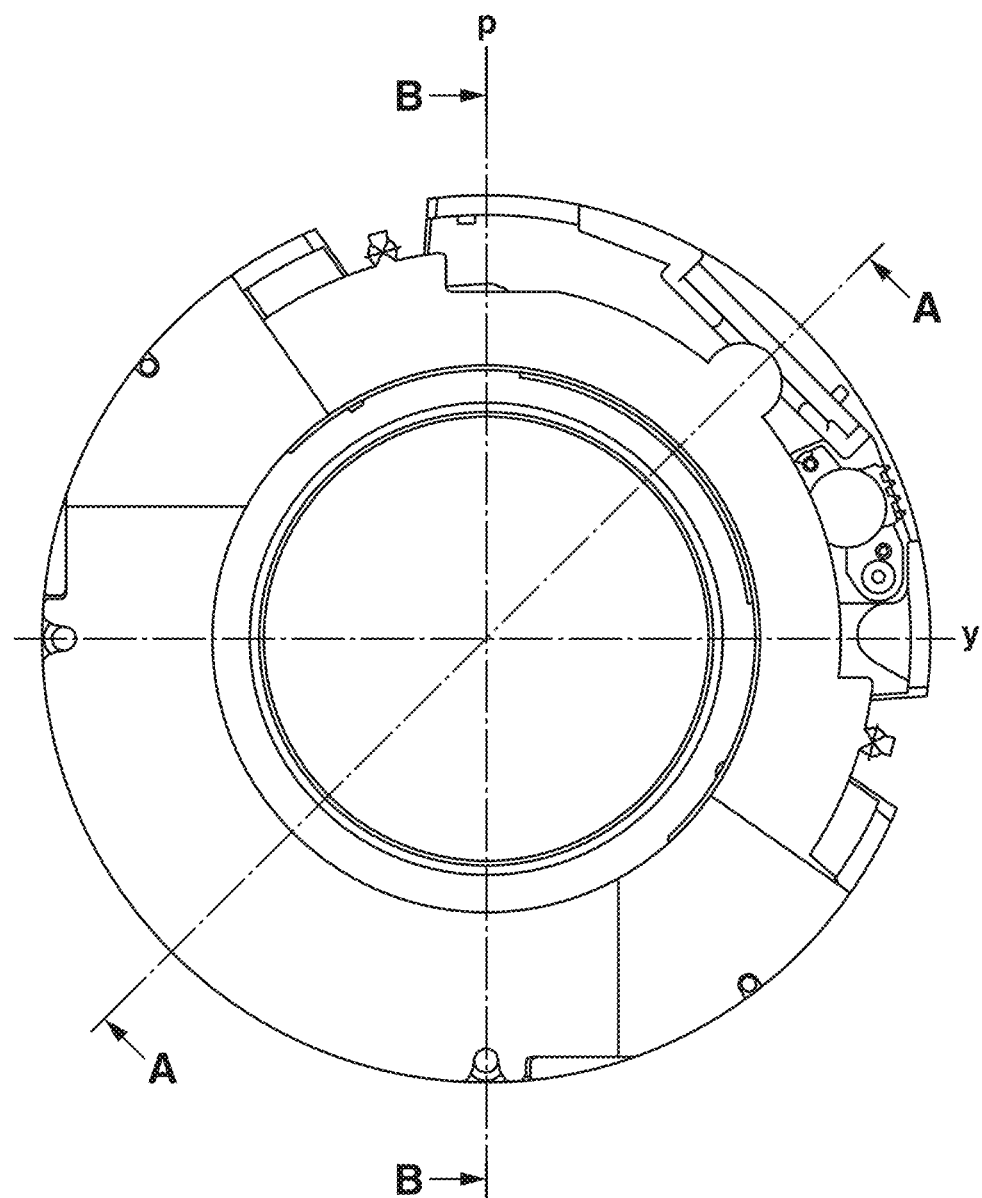
FIG. 3 is a front view of the image stabilization unit in the first exemplary embodiment as viewed from an optical axis direction.
Figure 4:
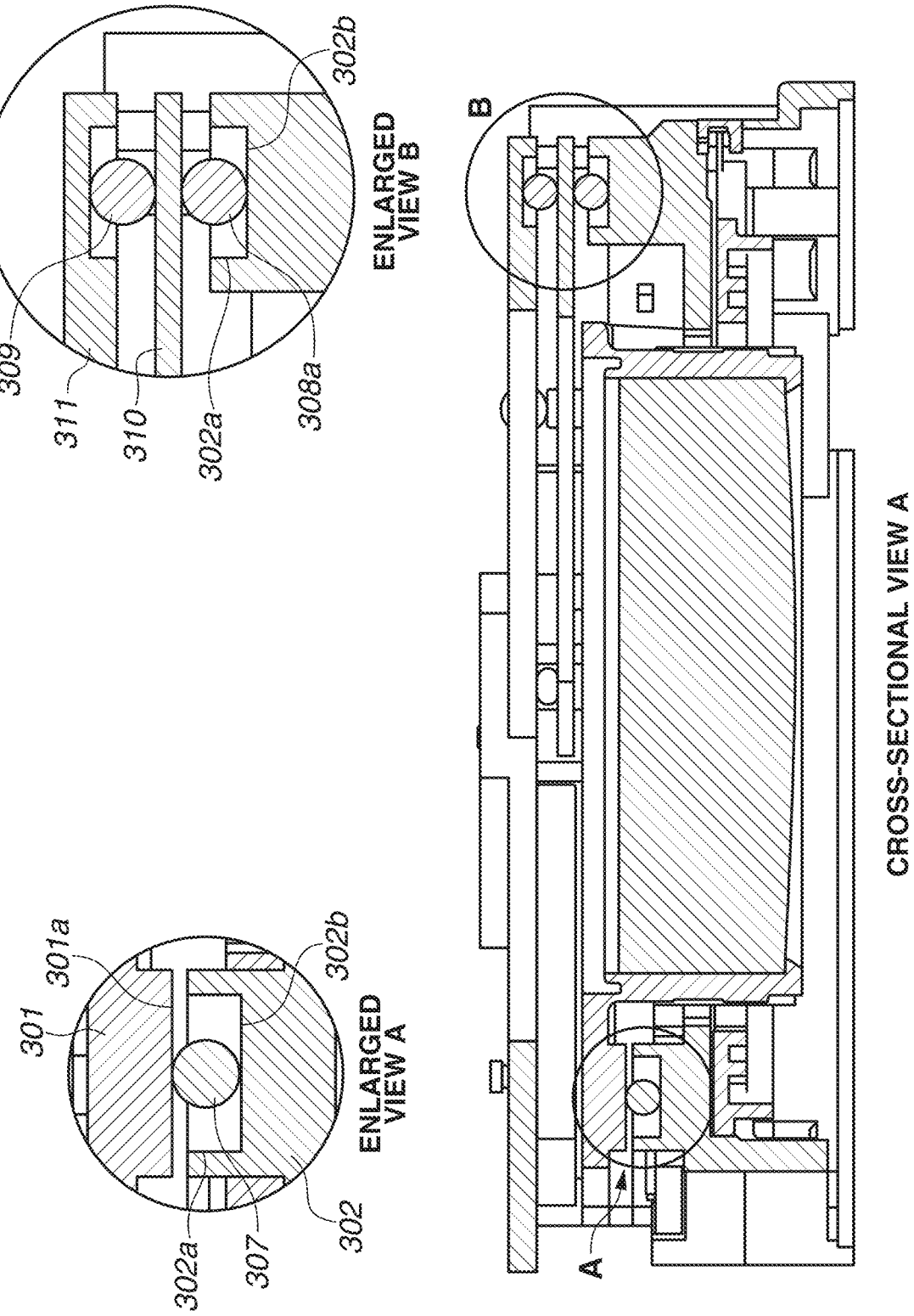
FIG. 4 is a cross-sectional diagram A and enlarged views of the image stabilization unit in the first exemplary embodiment.

Next, a configuration of an image stabilization unit 300 that is an image shake correction unit according to a first exemplary embodiment of the present disclosure is described with use of FIG. 2 to FIG. 4. FIG. 2 is an exploded perspective view of the image stabilization unit 300, FIG. 3 is a front view of the image stabilization unit 300 as viewed from the optical axis direction, and FIG. 4 is a cross-sectional diagram A of the image stabilization unit 300 and partial enlarged views of the cross-sectional diagram A.

A shift barrel 301 serving as a lens holding member holds the image shake correction lens unit 105, and is movable in a plane orthogonal to the optical axis. In addition, the shift barrel 301 is provided with a driving coil 303p as a first coil and a driving coil 303y as a second coil that are a part of the image shake correction driving source 108. The driving coil 303p and the driving coil 303y are fixed to the shift barrel 301 with an ultraviolet (UV) curing adhesive; however, may be fixed through a fixation method other than the UV curing adhesive.

A lower yoke 305 as a first yoke and an upper yoke 306 as a second yoke are fixed to a base member 302 through screwing, etc., in order to hold and position corresponding magnet pairs described below. Two magnets 304p as a first magnet pair and two magnets 304y as a third magnet pair are provided on the lower yoke 305. Two magnets 304p as a second magnet pair and two magnets 304y as a fourth magnet pair are provided on the upper yoke 306.

The first and second magnet pairs and the driving coil 303p included in a first driving unit have the following layout relationship. The first magnet pair is disposed on a side close to the base member 302 relative to the driving coil 303p, and the second magnet pair is disposed on a side opposite to the side close to the base member 302 relative to the driving coil 303p.

Likewise, the third and fourth magnet pairs and the driving coil 303y included in a second driving unit have the following layout relationship. The third magnet pair is disposed on a side close to the base member 302 relative to the driving coil 303y, and the fourth magnet pair is disposed on a side opposite to the side close to the base member 302 relative to the driving coil 303y.

A first ball 307 (first rolling member) is a rolling ball, and a material such as SUS440C and ceramics are used therefor. In particular, since ceramics are nonmagnetic material, the ceramics are not attracted to a magnet and are hardly affected by peripheral magnetism. Therefore, the balls including the first ball 307 are preferably made of a nonmagnetic material. As illustrated in FIG. 4, the first ball 307 is disposed in each of a plurality of rectangular concaves 302a provided on the base member 302, and three first balls 307 are provided in total. Each of the plurality of concaves 302a has a flat bottom surface.

The first ball 307 is in contact with a flat surface part 301a provided on the shift barrel 301. The shift barrel 301 is biased toward the base member 302 by biasing force from a biasing member described below, and, further, the first ball 307 is biased toward a flat surface part 302b of the concave 302a. Accordingly, the plurality of first balls 307 are provided in the respective concaves 302a sandwiched between the shift barrel 301 and the base member 302, which makes it possible to prevent the first balls 307 from going out of the respective concaves 302a.

(Configuration to Move Image Shake Correction Lens Unit 105)

Next, a configuration to move the image shake correction lens unit 105 in the p direction and the y direction that are orthogonal to the optical axis direction, and the principle thereof are described.

When the driving coil 303p is energized, a gap magnetic flux in a magnetic circuit and a magnetic flux generated by the driving coil 303p magnetically interfere each other, which generates so-called Lorenz force. Driving force is applied by the Lorenz force to the shift barrel 301, and the shift barrel 301 is accordingly driven in the p direction. In other words, the plurality of magnet pairs including the magnets 304p and the driving coil 303p constitutes the first driving unit that moves the shift barrel 301 in the p direction. Likewise, the plurality of magnet pairs including the magnets 304y and the driving coil 303y constitutes the second driving unit that moves the shift barrel 301 in the y direction.

(Configuration to Suppress Rotation of Shift Barrel 301 around Optical Axis)

Figure 5:
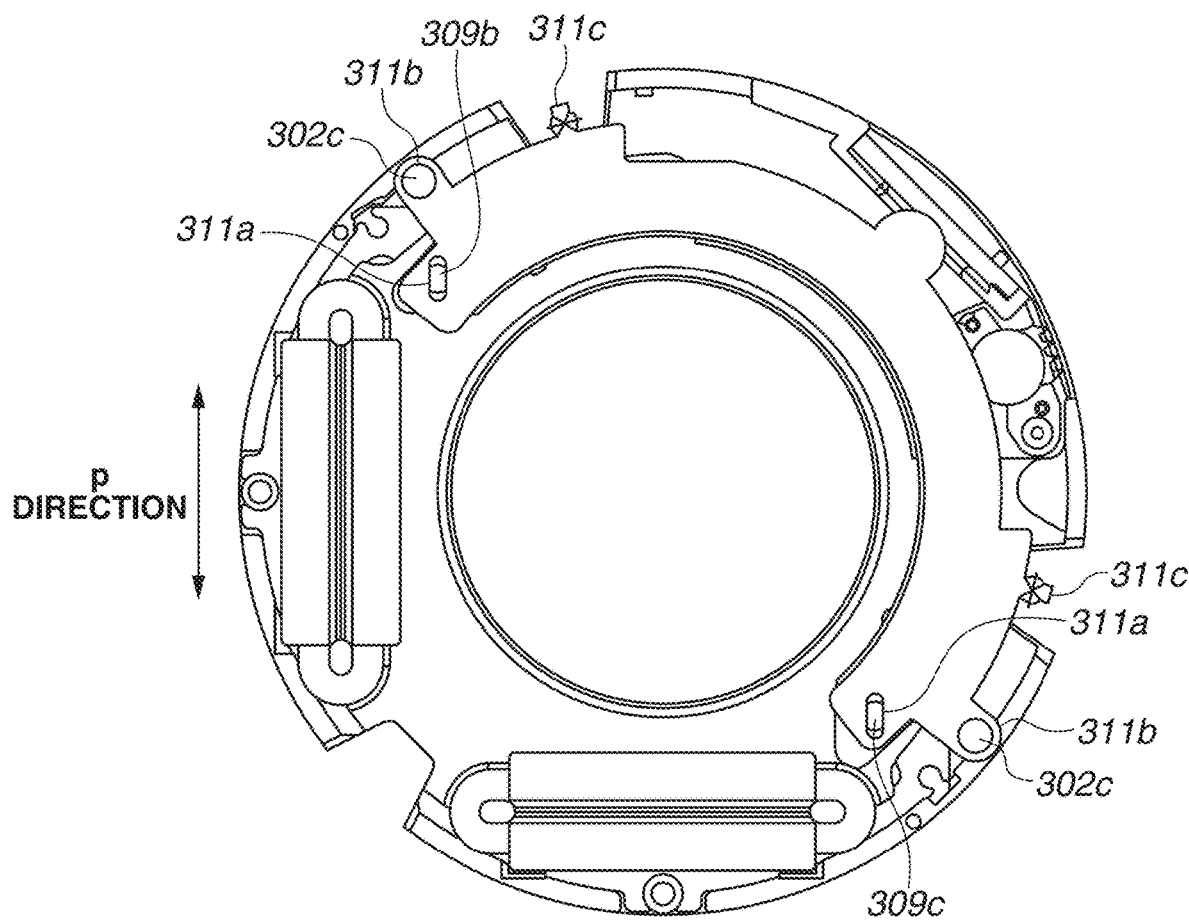
FIG. 5 is a diagram illustrating the image stabilization unit from which an upper yoke is removed.
Figure 6:
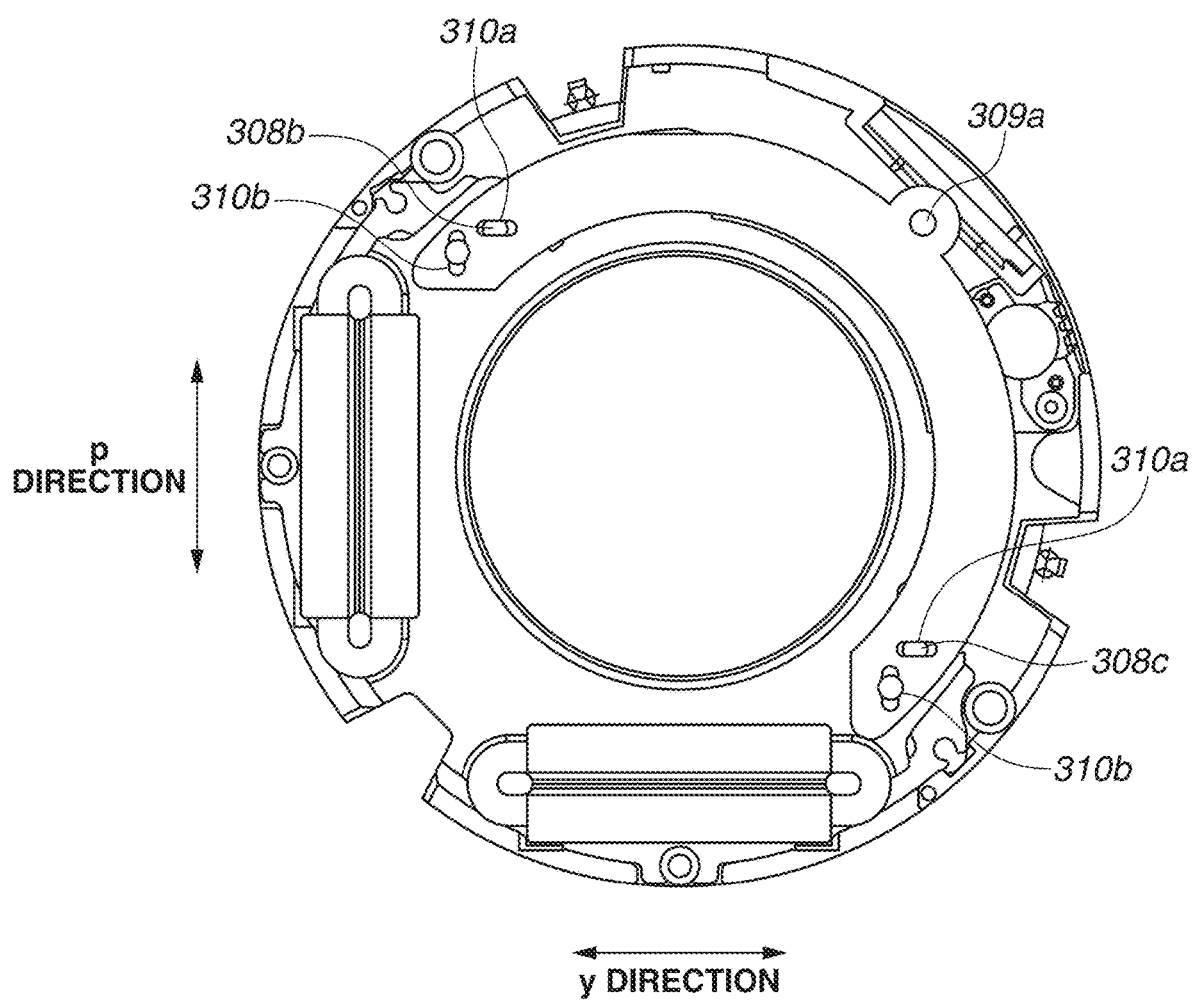
FIG. 6 is a diagram illustrating the image stabilization unit from which a second guide member is removed.
Figure 7:
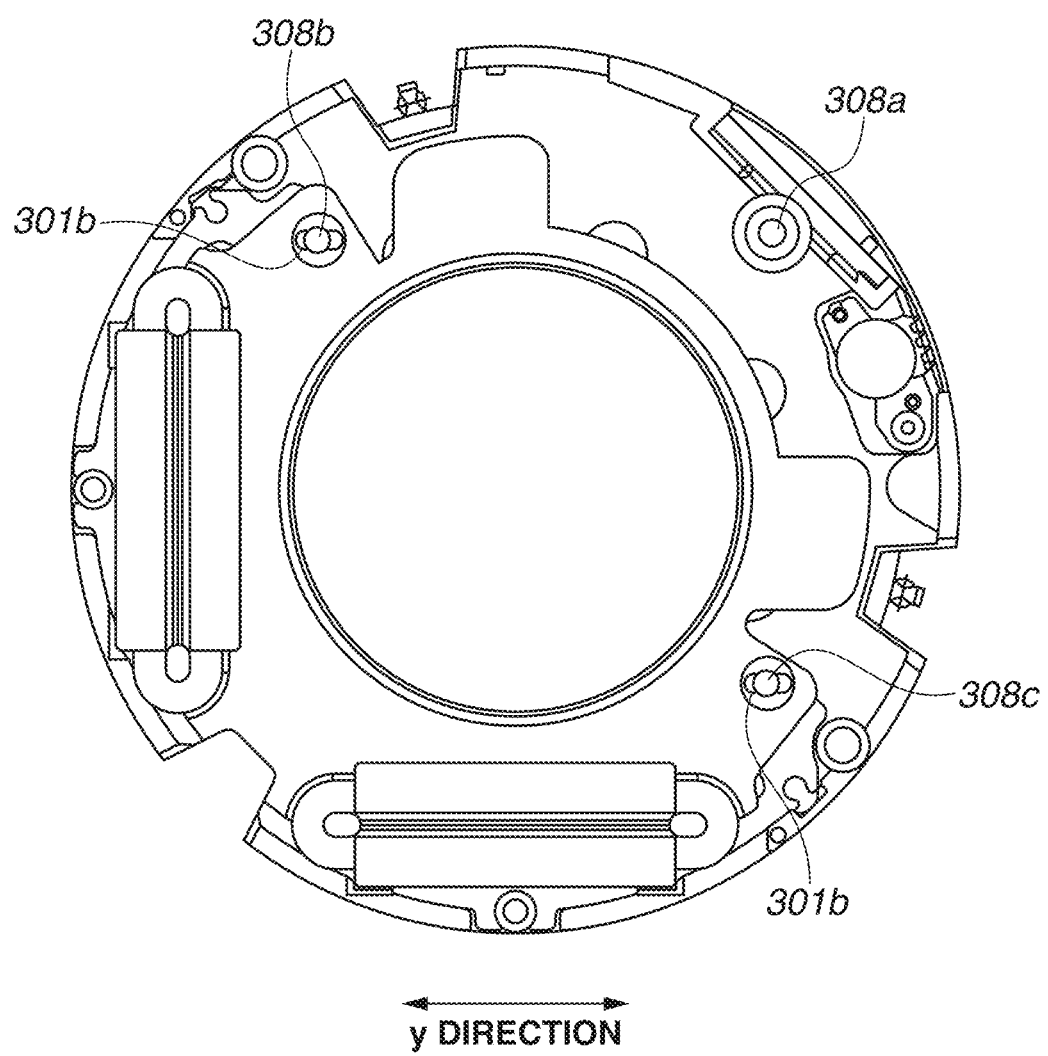
FIG. 7 is a diagram illustrating the image stabilization unit from which a first guide member is removed.
Figure 8:
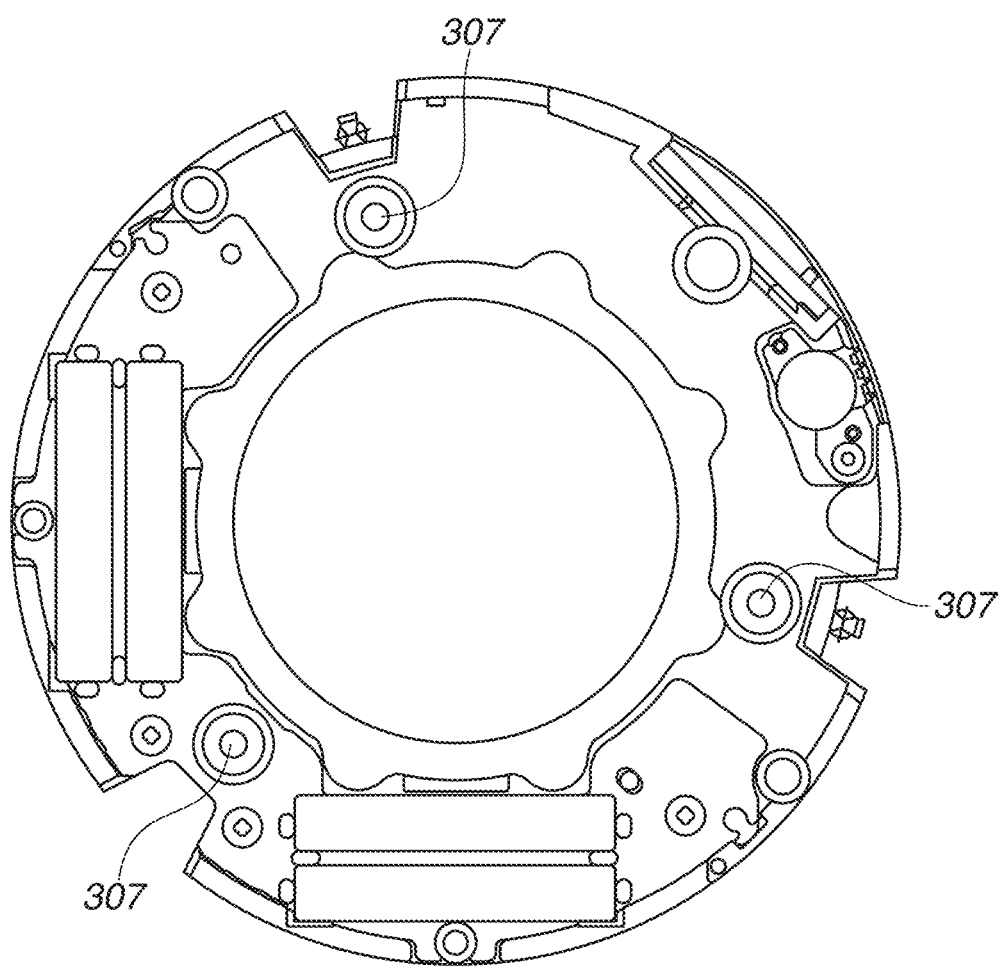
FIG. 8 is a diagram illustrating the image stabilization unit from which a shift barrel is removed.

Next, a configuration that suppresses rotation of the shift barrel 301 around the optical axis (hereinafter, simply referred to as rolling) and allows movement of the shift barrel 301 in the p direction and the y direction is described with use of FIG. 2 and FIG. 5 to FIG. 8. FIG. 5 to FIG. 8 are diagrams in the optical axis direction view illustrating the configuration of the image stabilization unit 300 from which a predetermined member is removed. FIG. 5 illustrates the configuration of the image stabilization unit 300 in a case where the upper yoke 306 is removed, FIG. 6 illustrates the configuration of the image stabilization unit 300 in a case where a second guide member 311 is further removed, FIG. 7 illustrates the configuration of the image stabilization unit 300 in a case where a first guide member 310 is further removed, and FIG. 8 illustrates the configuration of the image stabilization unit 300 in a case where the shift barrel 301 is further removed.

As illustrated in FIG. 2, in the optical axis direction, the first guide member 310 is disposed between the second guide member 311 and the shift barrel 301. Further, some (308b and 308c described below) of second balls 308 as second rolling members are disposed between the shift barrel 301 and the first guide member 310. The second ball 308a as the other second ball 308 is disposed between the base member 302 and the first guide member 310 as illustrated in the enlarged view B of FIG. 4.

Third balls 309 as third rolling members are disposed between the first guide member 310 and the second guide member 311. As described below, some (309b and 309c) of the third balls 309 are disposed between a guide groove provided in the first guide member 310 and a guide groove provided in the second guide member 311. Another third ball 309 (309a) is provided between the first guide member 310 and the second guide member 311. In other words, the rotation suppression unit includes the second guide member 311 that enables movement of the shift barrel 301 in the p direction as described below and is provided on a side opposite to a side of the shift barrel 301 relative to the first guide member 310.

(Relationship between Shift Barrel 301 and First Guide Member 310)

Two guide grooves 301b as the first guide grooves are provided in the shift barrel 301 as illustrated in FIG. 7, and two guide grooves 310a as the second guide grooves are provided in the first guide member 310 as illustrated in FIG. 6. As illustrated in FIG. 6 and FIG. 7, a longitudinal direction of the guide grooves 301b and a longitudinal direction of the guide grooves 310a are parallel to the y direction.

Biasing force by a tension spring 312 as a biasing member described below acts from the first guide member 310 toward the shift barrel 301 through the second guide member 311. As a result, the second balls 308b and 308c out of the second balls 308 illustrated in FIG. 7 respectively come into contact with the guide grooves 301b of the shift barrel 301 and the guide grooves 310a of the first guide member 310.

Such a configuration allows relative movement of the shift barrel 301 in the y direction accompanied by rolling of the second balls 308 with respect to the first guide member 310, and suppresses relative movement of the shift barrel 301 in a direction different from the y direction.

(Relationship between First Guide Member 310 and Second Guide Member 311)

Two guide grooves 310b as the third guide grooves are provided in the first guide member 310 as illustrated in FIG. 6, and two guide grooves 311a as the third guide grooves are provided in the second guide member 311 as illustrated in FIG. 5. As illustrated in FIG. 5 and FIG. 6, a longitudinal direction of the guide grooves 310b and a longitudinal direction of the guide grooves 311a are parallel to the p direction.

The biasing force by the tension spring 312 as the biasing member which is described below acts from the second guide member 311 toward the first guide member 310. As a result, the third balls 309b and 309c out of the third balls 309 illustrated in FIG. 5 respectively come into contact with the guide grooves 310b of the first guide member 310 and the guide grooves 311a of the second guide member 311.

Such a configuration allows relative movement of the first guide member 310 in the p direction accompanied by rolling of the third balls 309 with respect to the second guide member 311, and suppresses relative movement of the first guide member 310 in a direction different from the p direction.

More specifically, when the shift barrel 301 moves in the y direction, movement of the shift barrel 301 in a direction different from the y direction is suppressed by the second balls 308b and 308c and the guide grooves 301b and the guide grooves 310a extending in the y direction. When the shift barrel 301 moves in the y direction, relative movement between the first guide member 310 and the second guide member 311 is suppressed.

In contrast, when the shift barrel 301 moves in the p direction, movement of the shift barrel 301 in a direction different from the p direction is suppressed by the third balls 309b and 309c and the guide grooves 310b and the guide grooves 311a extending in the p direction. When the shift barrel 301 moves in the p direction, the shift barrel 301 and the first guide member 310 integrally move in the p direction because the relative movement between the shift barrel 301 and the first guide member 310 in a direction different from the y direction is suppressed. When the shift barrel 301 moves in the p direction and the y direction, the second guide member 311 does not move. More specifically, a positioning pin 302c of the base member 302 is inserted into a positioning hole 311b of the second guide member 311, which positions the second guide member 311 in a plane orthogonal to the optical axis.

As a result, movement of the shift barrel 301 in the p direction and the y direction is allowed, and movement in a direction different from the p direction and the y direction is suppressed. Accordingly, the rolling of the shift barrel 301 can be suppressed.

In each of the exemplary embodiments of the present disclosure, the above-described components which contribute to suppression of the rotation of the shift barrel 301 are collectively formed into the rotation suppression unit. More specifically, the rotation suppression unit includes the first guide member 310, the second guide member 311, the second balls 308b and 308c, and the third balls 309b and 309c.

(Configuration to Bias Shift Barrel 301 to Base Member 302 in Optical Axis Direction)

Next, a configuration for biasing the shift barrel 301 to the base member 302 in the optical axis direction is described with use of FIG. 2 and FIG. 5. As illustrated in FIG. 2, an end of the tension spring 312 as the biasing member is provided on an attachment portion 302d of the base member 302. The other end is provided on an attachment portion 311c of the second guide member 311 illustrated in FIG. 5. As a result, the tension spring 312 can bias the second guide member 311 toward the first guide member 310 and the shift barrel 301 in the optical axis direction.

(Transmission Path of Biasing Force Generated by Tension Spring 312)

Figure 9:
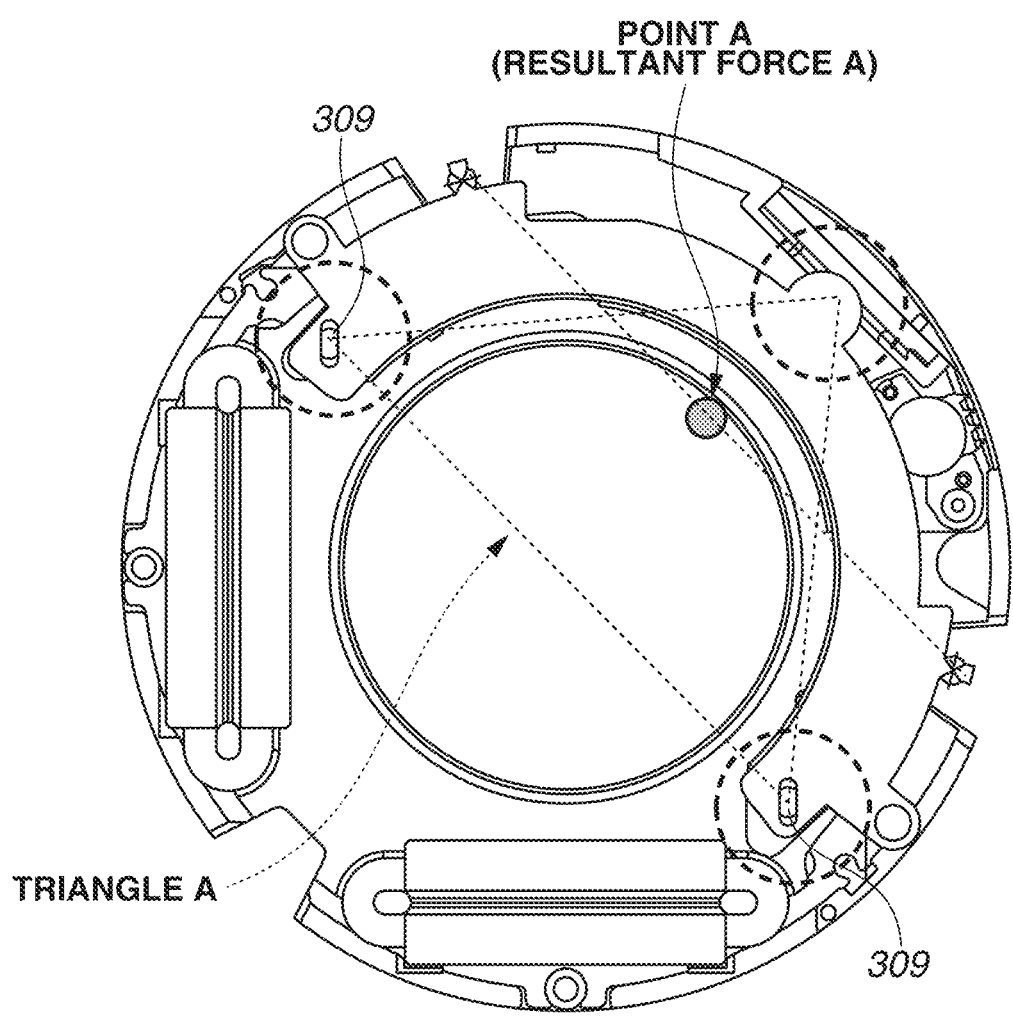
FIG. 9 is a diagram illustrating relationship between a triangle A and resultant force A.
Figure 10:
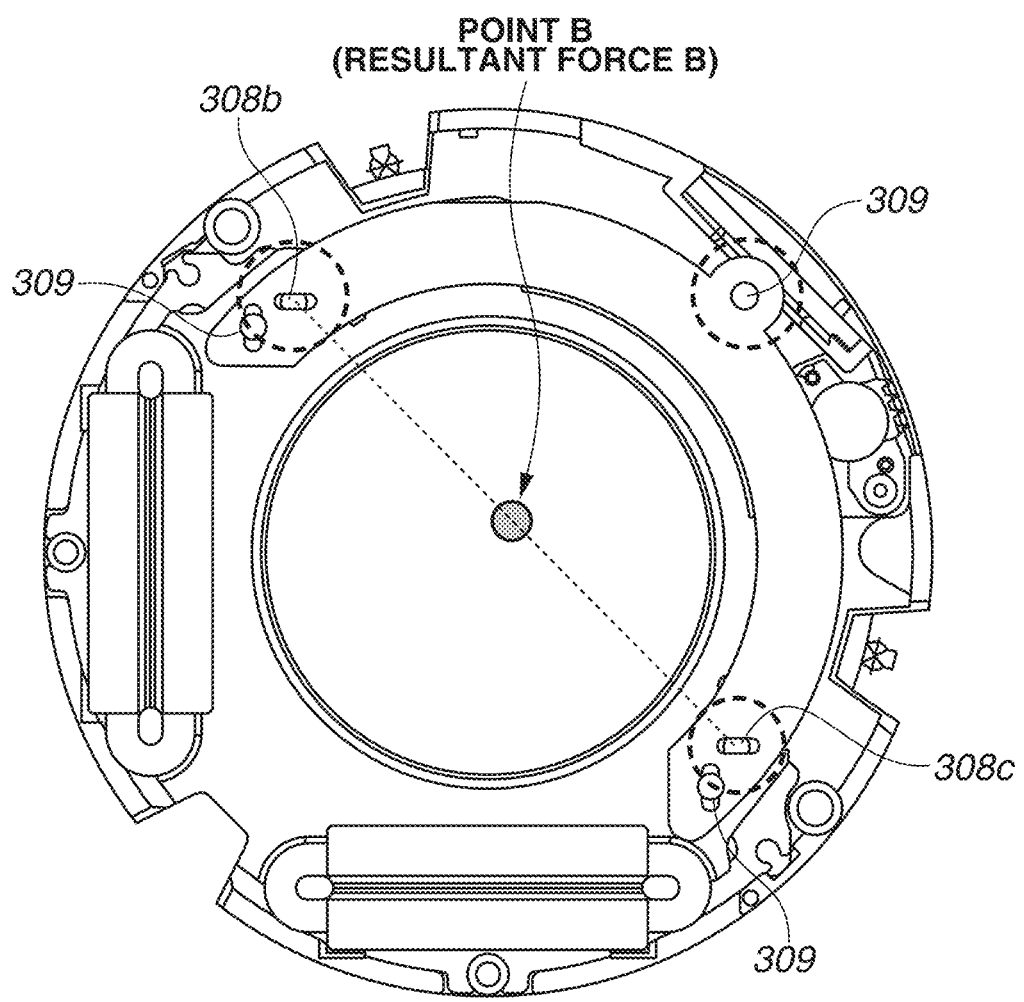
FIG. 10 is a diagram illustrating resultant force B applied to the first guide member and the shift barrel.
Figure 11:
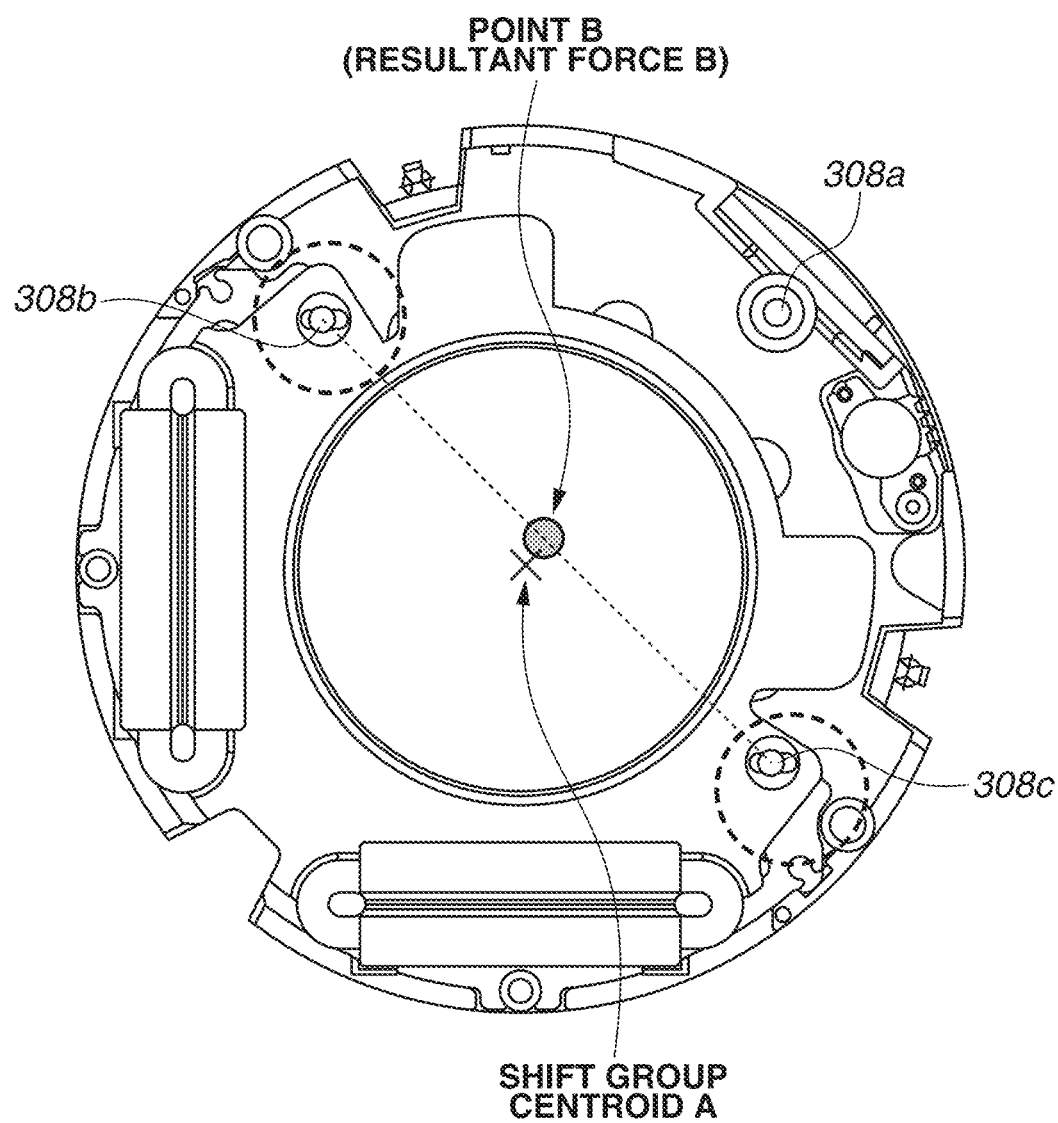
FIG. 11 is a diagram illustrating relationship between the resultant force B applied to the shift barrel and a shift group centroid A.
Figure 12:
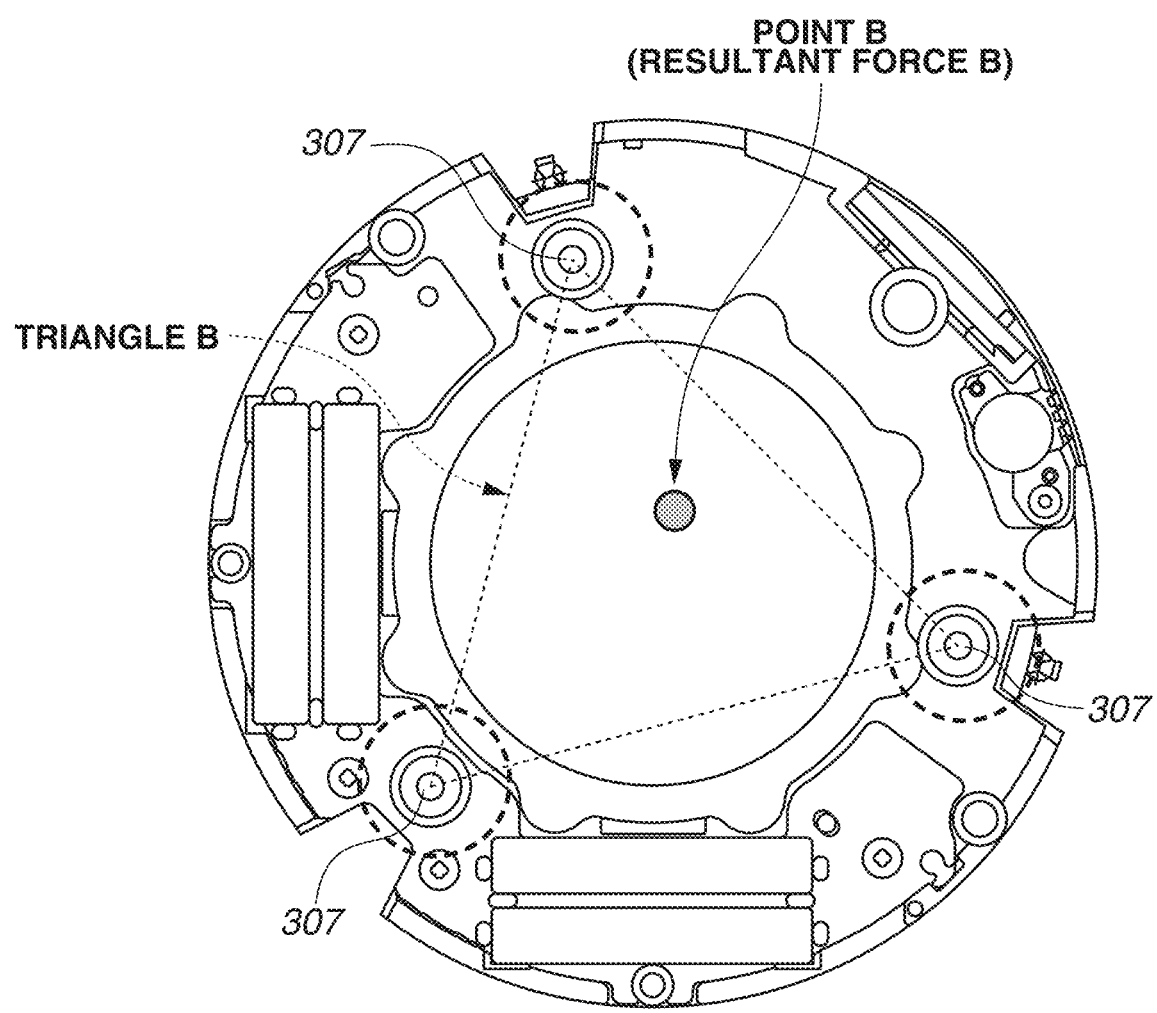
FIG. 12 is a diagram illustrating relationship between a triangle B and the resultant force B.

Next, a transmission path of the biasing force generated by the tension spring 312 is described with use of FIG. 9 to FIG. 12. FIG. 9 is a diagram illustrating relationship between a triangle A and a resultant force A by two tension springs 312. The triangle A connects centroids of the respective three balls 309 when viewed in the optical axis direction. FIG. 10 is a diagram illustrating a resultant force B applied to the first guide member 310 and the shift barrel 301, and a point B that is a middle point of a line segment connecting the two second balls 308b and 308c. FIG. 11 is a diagram illustrating relationship between the resultant force B applied to the shift barrel 301 and a shift group centroid A, and FIG. 12 is a diagram illustrating relationship between the resultant force B and a triangle B that connects centroids of three first rolling balls 307.

The biasing force by the two tension springs 312 is transmitted from the second guide member 311 to the first guide member 310 through the three third balls 309. As illustrated in FIG. 9, the resultant force of the biasing force by the two tension springs 312 acts on a point A inside the triangle A. This makes it possible to stably bias the first guide member 310 toward the shift barrel 301. Since the second ball 308a is disposed between the base member 302 and the first guide member 310, the biasing force by the tension springs 312 is received by the base member 302 functioning as the fixed member.

As illustrated in FIG. 10, the second ball 308b and the second ball 308c are disposed between the shift barrel 301 and the first guide member 310, and transmit the biasing force from the first guide member 310 to the shift barrel 301 through two positions.

At this time, as illustrated in FIG. 11, the resultant force B with respect to the shift group centroid A acts on the point B near the shift group centroid A, which makes it possible to stably bias the shift barrel 301 in the optical axis direction while suppressing inclination of the shift barrel 301 as viewed from the direction orthogonal to the optical axis. The shift group centroid A used here is a centroid of the shift group in a case where the shift barrel 301, the image shake correction lens unit 105, the driving coil 303p, and the driving coil 303y are assembled to be the shift group. More specifically, in the optical axis direction view, a distance between the above-described shift group centroid A and the point B that is the middle point of the line segment connecting the centroids of the respective second rolling bolls 308b and 308c is preferably smaller than one-fifth or one-tenth of an outer diameter of the image shake correction lens unit 105.

In addition, as illustrated in FIG. 12, the resultant force B of the biasing force working through the second ball 308b and the second ball 308c acts on the point B inside the triangle B. This makes it possible to stably bias the shift barrel 301.

(Configuration Enabling Downsizing more than Existing Configuration)

Next, a configuration enabling downsizing in a radial direction more than the existing configuration in the image stabilization unit 300 according to the above-described first exemplary embodiment is described with reference to FIG. 13 and FIG. 14.

Figure 13:
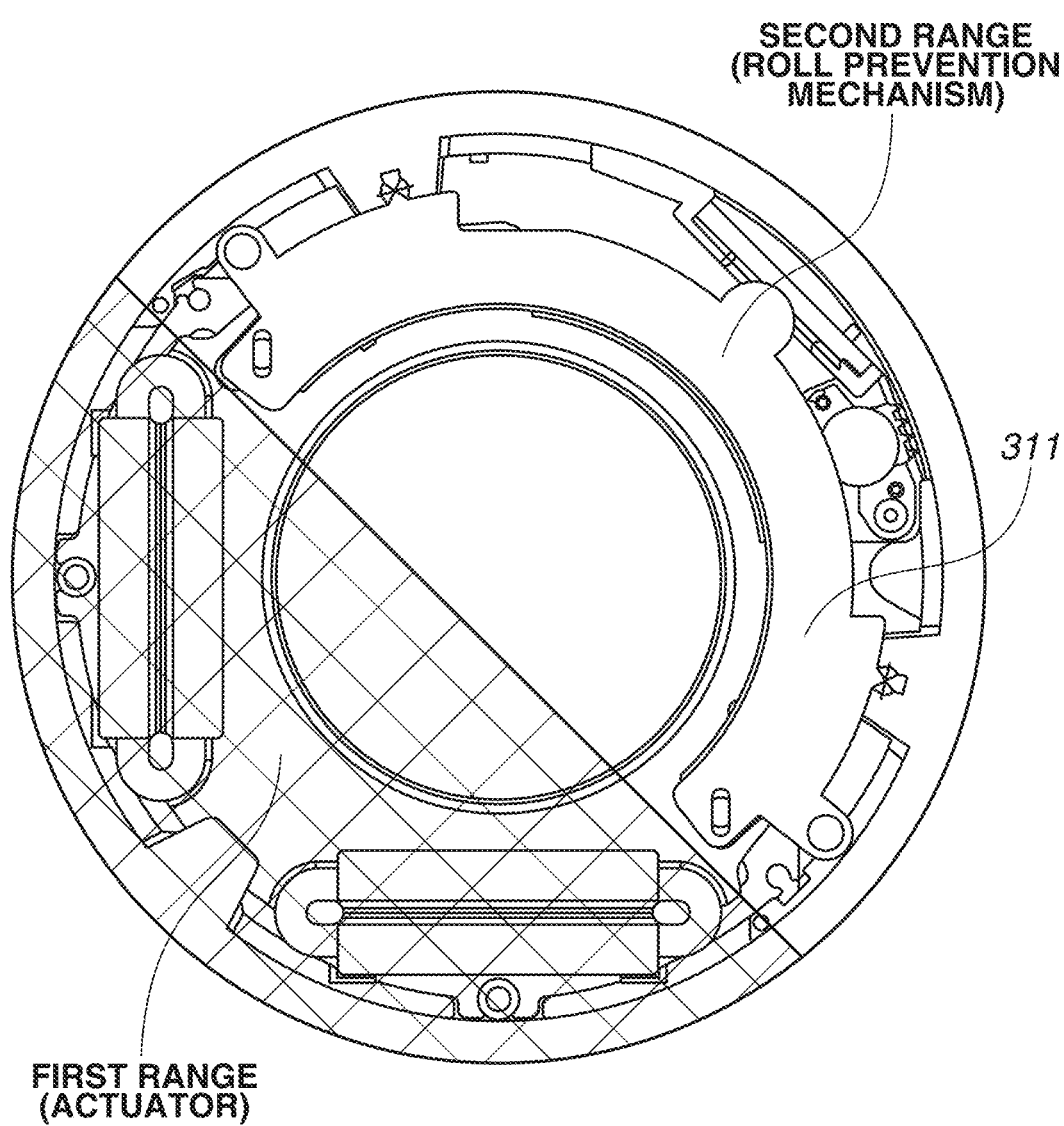
FIG. 13 is a diagram illustrating component layout of the image stabilization unit in the first exemplary embodiment.

As illustrated in FIG. 13, at least a part of the rotation suppression unit is disposed in a second range that is different from a first range in which at least a part of the first driving unit and at least a part of the second driving unit are disposed, in the optical axis direction view. The parts of the first and second driving units refer to corresponding coils and corresponding magnet pairs. Likewise, at least the part of the rotation suppression unit refers to the first guide member 310 and the second guide member 311.

Further, the first range and the second range indicated in FIG. 13 may also be defined as follows. Attention is focused to a straight line that passes through the image shake correction lens unit 105, and passes through a position different from the driving unit and the rotation suppression unit when the image stabilization unit 300 is viewed from the optical axis direction of the image shake correction lens unit 105. In this case, with respect to the straight line, either of the driving unit side or the rotation suppression unit side is referred to as the first range, and the other side is referred to as the second range. In the first exemplary embodiment, the first range is the side of the driving unit and the second range is the side of the rotation suppression unit.

As described above, in the image shake correction lens unit 105, in the optical axis direction view, at least a part of the rotation suppression unit is disposed in the second range that is different from the first range. In the first range, at least a part of the first driving unit and at least a part of the second driving unit are disposed. More specifically, when the image stabilization unit 300 is viewed from the optical axis direction of the image shake correction lens unit 105, at least a part of the first and second driving units (at least a part of the driving unit) is located on a circumference of a circle C1 that has a predetermined radius centering on an optical axis $OA_{105}$. Further, at least a part of the rotation suppression unit is located on the circumference of the circle C1.

In other words, the first guide member 310 has a shape satisfying the following conditions. A part of the entire circumference of the circle C1 that has the predetermined radius centering on the optical axis $OA_{105}$ passes above the first guide member 310, and the other part of the entire circumference of the circle C1 does not pass above the first guide member 310. Further, in other words, the first guide member 310 has a shape of a circle which has a predetermined radius centering on the optical axis $OA_{105}$ and of which an entire circumference does not overlaps with the first guide member 310. The shape of the second guide member 311 is similarly restated. In other words, the first guide member 310 and the second guide member 311 each have a C shape.

Therefore, as illustrated in FIG. 14A, in the optical axis direction view, it is possible to bring the driving coils 303p and 303y and the magnet pairs 304p and 304y closer to the first guide member 310 and the second guide member 311, as compared with the existing configuration. As a result, according to the first exemplary embodiment, it is possible to realize the image shake correction unit smaller than the existing image shake correction unit. In particular, the above-described configuration can realize the image shake correction unit which is smaller in radial direction than the existing image shake correction unit.

In a case where a guide member 3110 has an annular shape as illustrated in FIG. 14B, it is not possible to bring magnets 3040p and 3040y so close to the guide member 3110 in the optical axis view as the first exemplary embodiment. The annular shape used herein refers to a shape overlapping with an entire circumference of a circle that has a predetermined diameter centering on the optical axis $OA_{1050}$, as with a circle C4 illustrated in FIG. 14B. The above-described C shape refers to the shape overlapping with only a part of the circumference of the circle that has the predetermined radius centering on the optical axis $OA_{105}$, as with the circle C1 illustrated in FIG. 14A.

In other words, in a case where the guide member 3110 has a shape making the circle C4 possible that has an entire circumference overlapping with the guide member 3110 centering on the optical axis $OA_{1050}$ of the image shake correction lens unit 1050, the image shake correction unit becomes larger in the radial direction than the image shake correction unit in the first exemplary embodiment. In FIG. 14B, although a circle C2 passing through only the guide member 3110 and a circle C3 passing through only the magnets 3040p and 3040y exist, there is no circle which is located on circumferences of the guide member 3110 and the magnets 3040p and 3040y.

In addition, the tension springs 312 as the biasing members are disposed not between the shift barrel 301 and the base member 302 but between the base member 302 and the second guide member 311. Therefore, even in a case where the shift barrel 301 moves in the direction orthogonal to the optical axis, the tension springs 312 are not inclined and pullback force is not generated. This makes it possible to move the shift barrel 301 with small force and to save power. Accordingly, it is possible to further downsize the image stabilization unit 300 with use of the first driving source and the second driving source that are smaller in output and size than the existing driving source.

Other Effects Achieved by First Exemplary Embodiment

If the driving unit and the rotation suppression unit are provided in the first range or the second range in FIG. 13, the position of the driving unit and the position of the rotation suppression unit in the optical axis direction are different from each other as viewed from the direction orthogonal to the optical axis. As a result, the image shake correction lens unit 105 is upsized in the optical axis direction. Therefore, it is not desirable that the driving unit and the rotation suppression unit are provided in the same range. In contrast to such a configuration, the image stabilization unit 300 in the first exemplary embodiment has a configuration described below to suppress upsizing in the optical axis direction.

Figure 15:
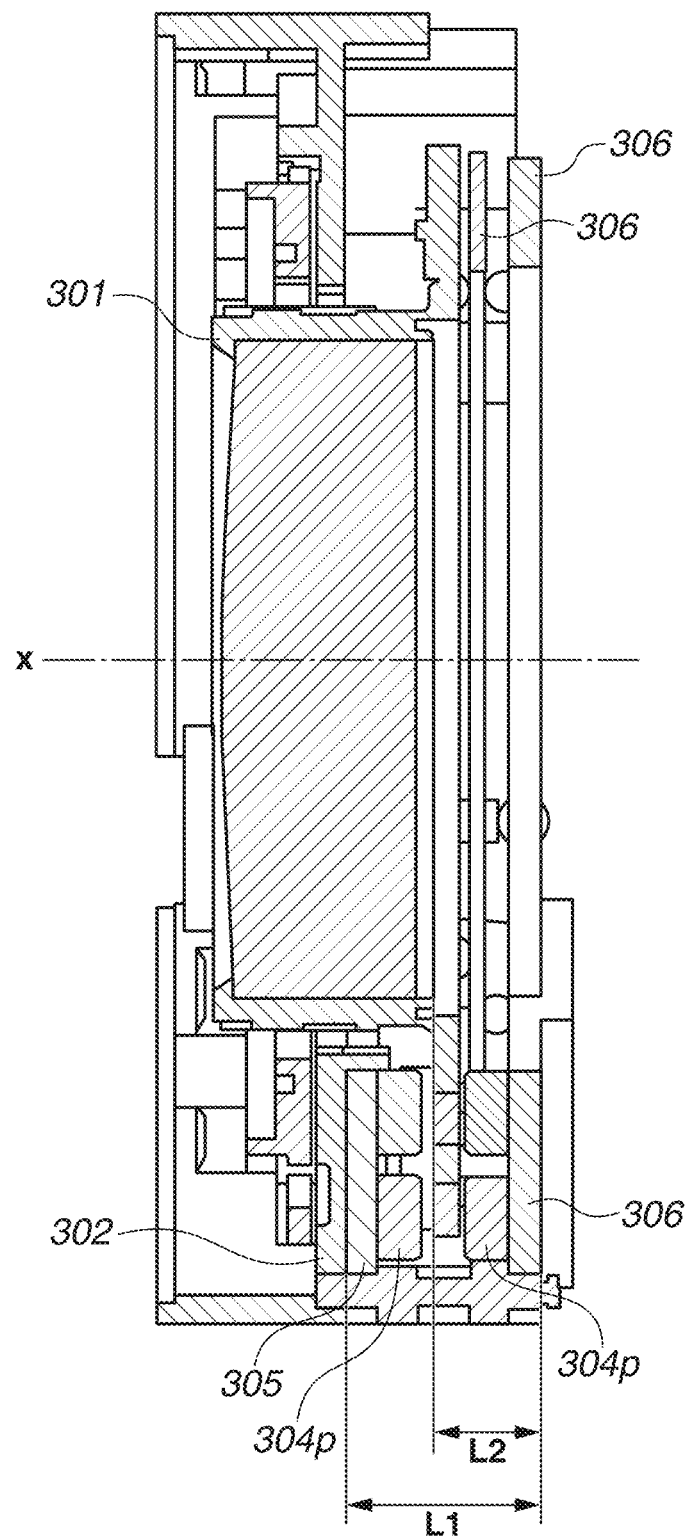
FIG. 15 is a cross-sectional diagram B of the image stabilization unit in the first exemplary embodiment.

As illustrated in FIG. 15, a distance from the lower yoke 305 to the upper yoke 306 through the driving coil and the magnets in the optical axis direction is denoted by L1, and a distance from the first guide member 310 to the second guide member 311 as a part of the rotation suppression unit is denoted by L2. In this case, the distance L1 is larger than the distance L2, and a region that has a width of the distance L1 and a region that has a width of the distance L2 overlap with each other as viewed from the direction orthogonal to the optical axis. Therefore, it is possible to downsize the image shake correction unit in the optical axis direction.

In other words, at least a part of the rotation suppression unit is provided in the region that has the width equal to the distance from the lower yoke 305 to the upper yoke 306. More specifically, at least a part of the driving unit and at least a part of the rotation suppression unit overlap with each other when the image stabilization unit 300 is viewed from the direction orthogonal to the optical axis of the image shake correction lens unit 105.

Therefore, in the first exemplary embodiment, the first range in which the first driving source and the second driving source are disposed and the second range in which the first guide member 310 and the second guide member 311 as a part of the rotation suppression unit are disposed does not overlap with each other as viewed from the optical axis direction. On the other hand, the first range and the second range overlap with each other as viewed from the direction orthogonal to the optical axis. This makes it possible to downsize the image stabilization unit 300 in the radial direction as compared with the existing configuration.

Further, the first ball 307, the second balls 308b and 308c, the third ball 309, and the second ball 308a that are rolling balls are disposed as in the first exemplary embodiment, which makes it possible to stably bias the shift barrel 301 even with the two tension springs 312.

A configuration of the image stabilization unit 300 as a second exemplary embodiment is described with reference to FIG. 16 to FIG. 19. The second exemplary embodiment is different from the above-described first exemplary embodiment in that a tension spring 403 as a second biasing member is newly provided in addition to the two tension springs 312 as the first biasing members.

(Influence in case of Image Shake correction Lens Unit having Small Diameter)

In the above-described first exemplary embodiment, the diameter of the image shake correction lens unit 105 is large, and the shift group centroid A is close to the optical axis of the image shake correction lens unit 105. In a case where the image shake correction lens unit has a small diameter and a light weight, however, the centroid of the shift group gets close to the driving coil fixed to the shift barrel. As a result, the positional displacement of the resultant force B and the shift group centroid becomes larger than that in the above-described first exemplary embodiment, and the shift barrel 301 easily falls over if an impact is applied.

Accordingly, in the second exemplary embodiment, description is given of an image stabilization unit 400 that can stably bias the shift barrel even in a case where the position of the shift group centroid is close to the driving coil, namely, even in a case where the diameter of the image shake correction lens unit is small.

(Configuration of Image stabilization Unit 400)

Figure 16:
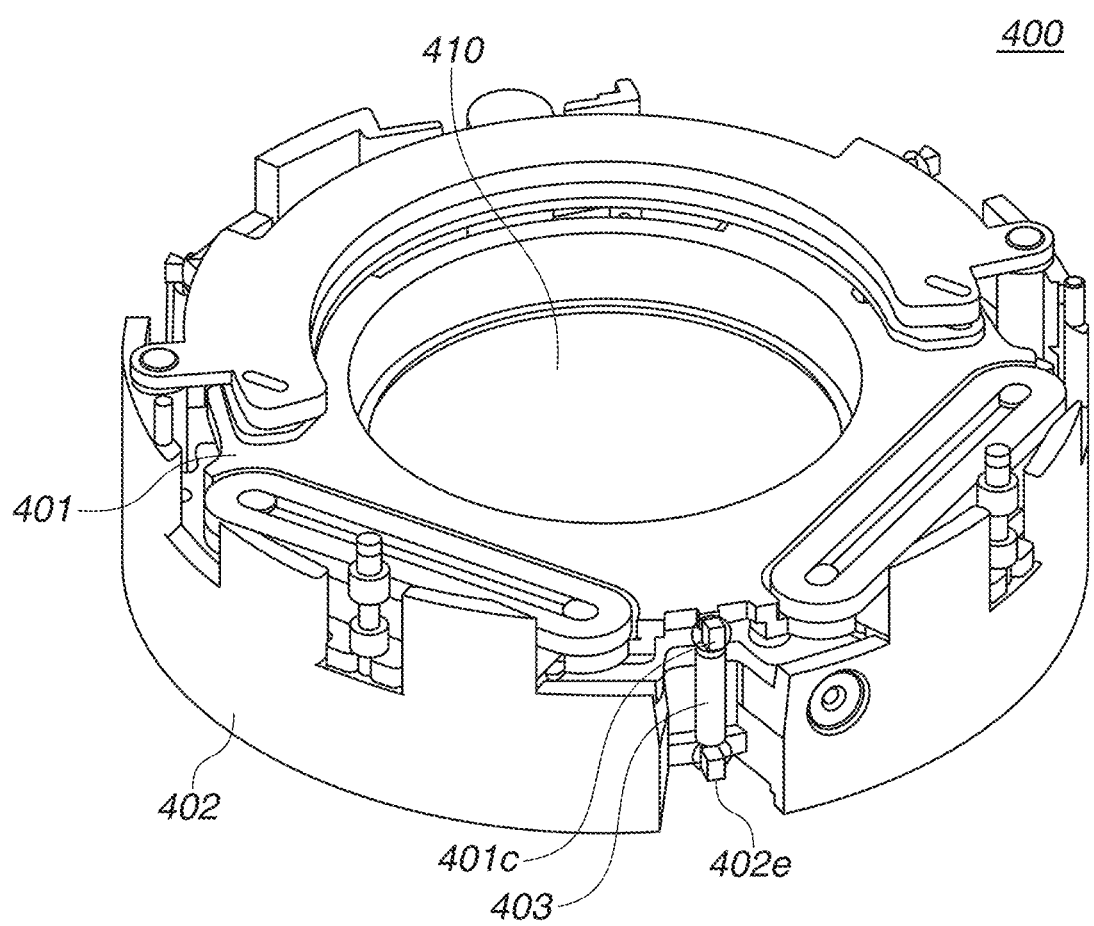
FIG. 16 is a perspective view of an image stabilization unit in a second exemplary embodiment.
Figure 17:
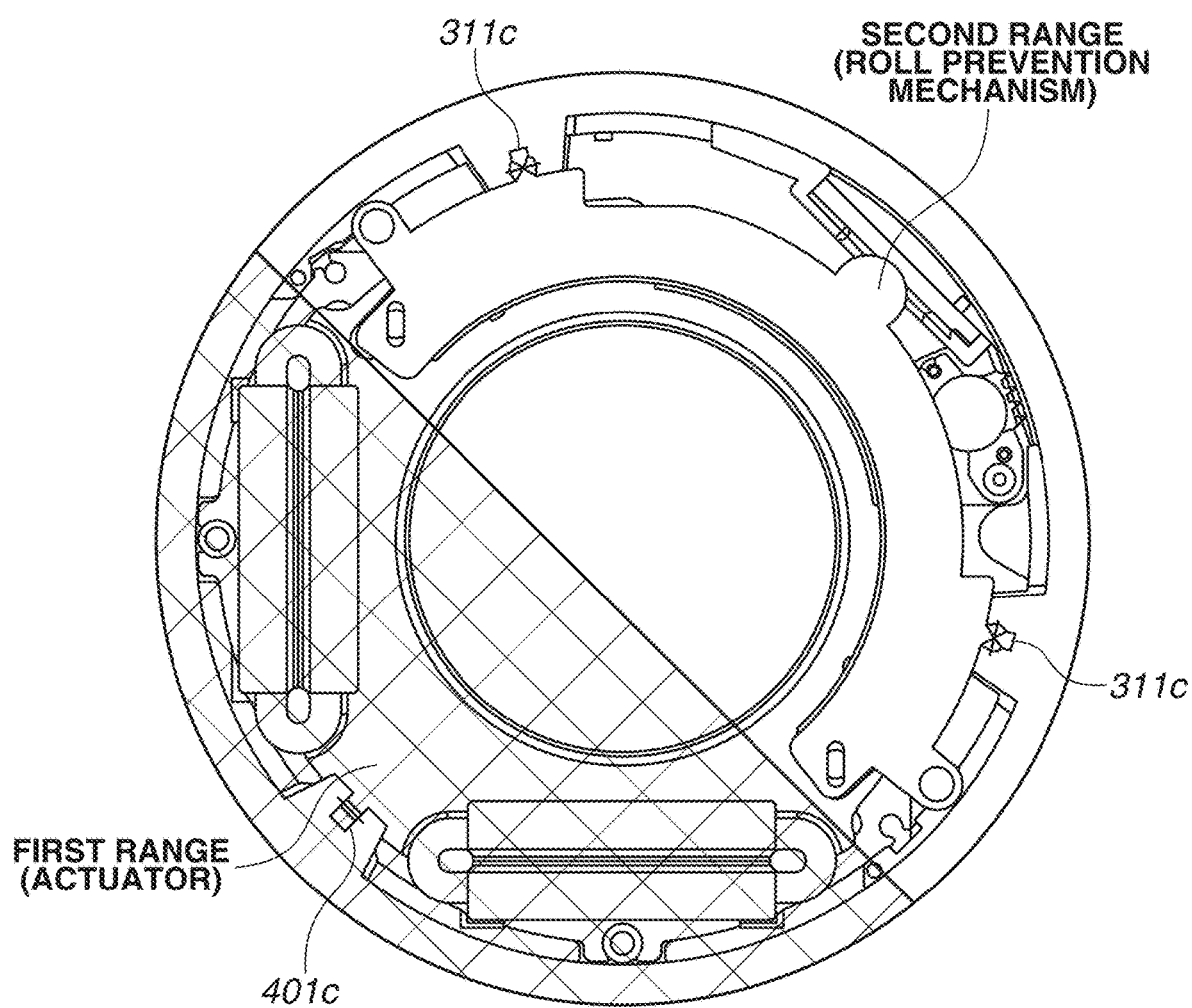
FIG. 17 is a diagram illustrating component layout of the image stabilization unit in the second exemplary embodiment.

A configuration of the image stabilization unit 400 is described with reference to FIG. 16 and FIG. 17. FIG. 16 is a perspective view of the image stabilization unit 400, and FIG. 17 is an explanatory diagram of component layout of the image stabilization unit 400. In the following description, parts different from the first exemplary embodiments are only described and description of other parts is omitted because the other parts are similar to the first exemplary embodiment.

A shift barrel 401 holds an image shake correction lens unit 410 that has a diameter and a weight less than the image shake correction lens unit 105. The tension spring 403 as the second biasing member is disposed between the magnet 304p and the magnet 304y. One end of the tension spring 403 is provided on a spring hook portion 401c of the shift barrel 401, and the other end is provided on a spring hook portion 402e of a base member 402. The tension spring 403 biases the shift barrel 401 toward the base member 402.

In the above-described first exemplary embodiment, the biasing member and the attachment portion are provided only in the second range. In the second exemplary embodiment, as illustrated in FIG. 17, the two tension springs 312 are disposed as the first biasing members in the second range, and the one tension spring 403 is disposed as the second biasing member in the first range.

The spring force of the second biasing member is set to minimum spring force sufficient to bring a point C on which a resultant force C acts as described below, close to the shift group centroid B, so that a pullback force due to inclination of the biasing member can be suppressed. Therefore, elastic force of the tension spring 403 is weaker than elastic force of each of the tension springs 312. In other words, a spring constant of the tension spring 403 is smaller than a spring constant of each of the tension springs 312. In addition, only the tension spring 403 serves as the biasing member causing the pullback force, as compared with the existing configuration, it is possible to suppress the pullback force to one-third or lower of the existing configuration.

(Transmission Path of Biasing Force Generated by Tension Springs 312 and Tension Spring 403)

Figure 18:
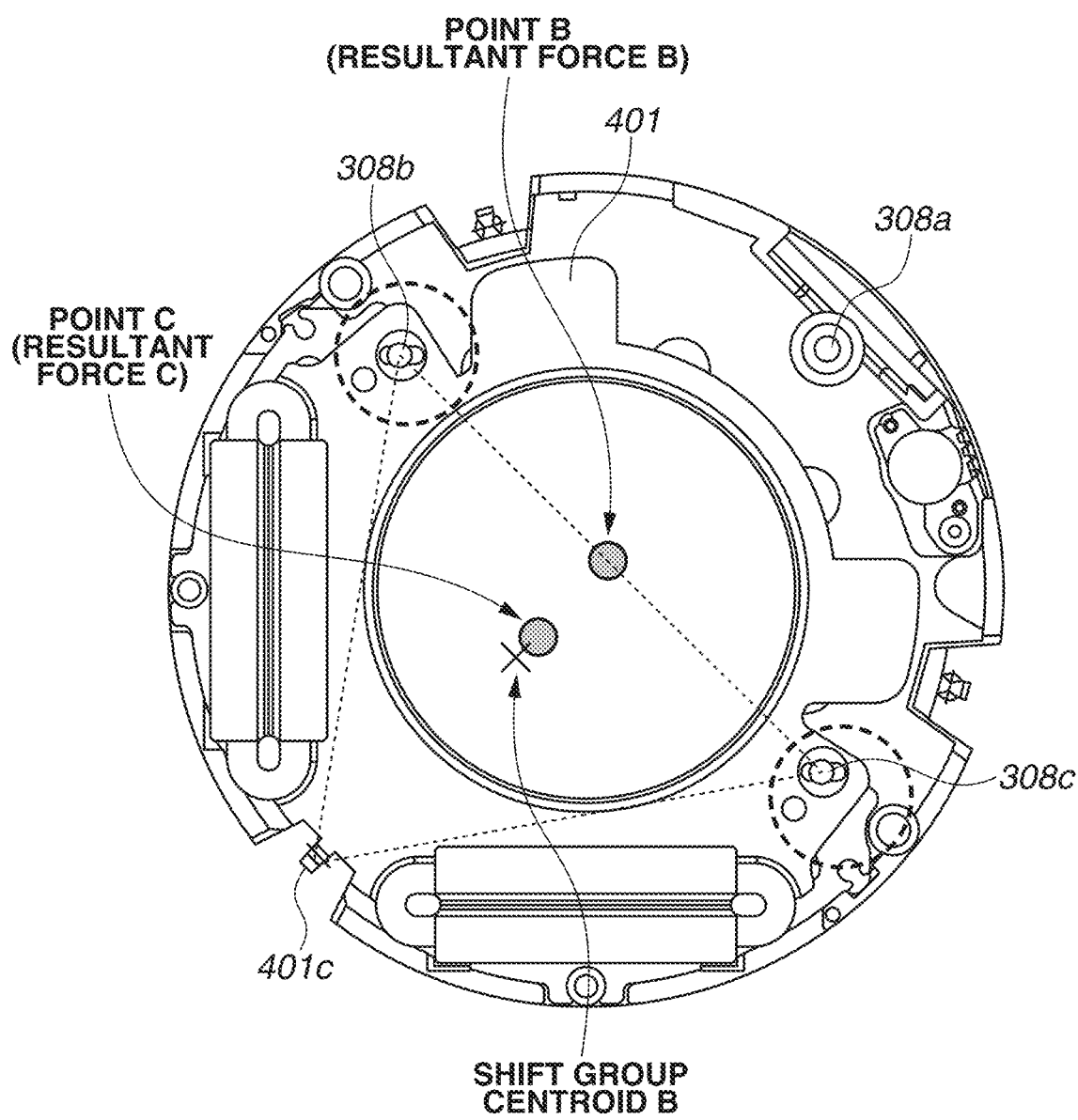
FIG. 18 is a diagram illustrating relationship between a shift group centroid B and both of the resultant force B and resultant force C applied to the shift barrel.
Figure 19:
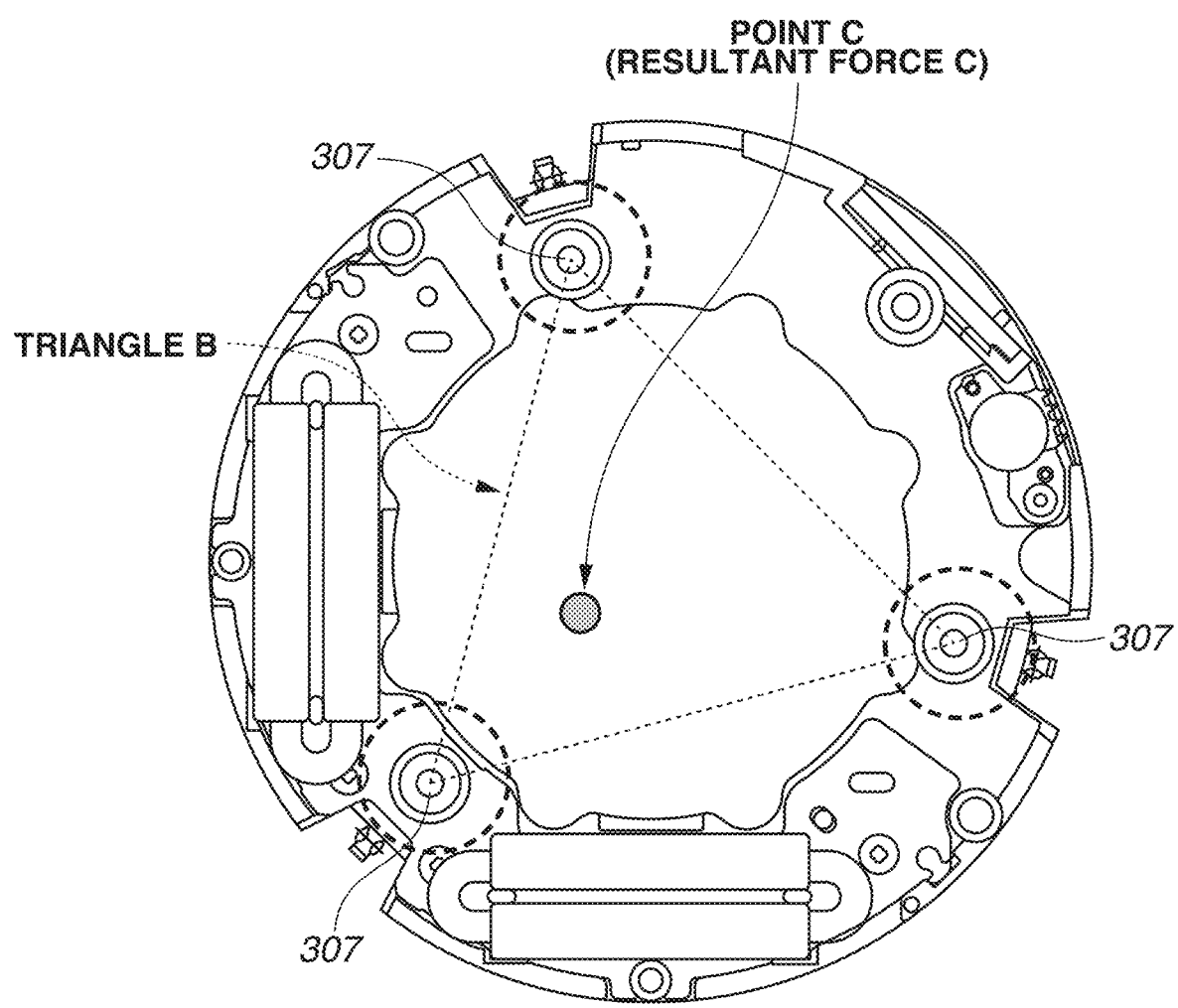
FIG. 19 is a diagram illustrating relationship between the triangle B and the resultant force C.

Next, a transmission path of the biasing force generated by the tension springs 312 and the tension spring 403 is described with use of FIG. 18 and FIG. 19. FIG. 18 is a diagram illustrating relationship between a shift group centroid B and both of the resultant force B and the resultant force C applied to the shift barrel 401. FIG. 19 is a diagram illustrating relationship between the triangle B and the resultant force C.

The resultant force B is the biasing force produced by the tension springs 312 as the first biasing members, and is transmitted to the shift barrel 401 through the two positions of the second ball 308b and the second ball 308c, thereby acting on the position of the point B. The point B is a middle point of a line segment connecting the centroid of the second ball 308b and the centroid of the second ball 308c.

As described above, in the second exemplary embodiment, the biasing force by the tension spring 403 acts on the shift barrel 401 in addition to the biasing force by the tension springs 312. Therefore, the resultant force C obtained by synthesizing the biasing force by the tension spring 403 and the biasing force by the two tension springs 312 acts on the point C. As a result, as illustrated in FIG. 18, the point C on which the resultant force C acts gets close to the shift group centroid B, which makes it possible to suppress falling of the shift group, which results in stable biasing.

The point C and the shift group centroid B do not necessarily fully overlap with each other. It is sufficient that the distance between the point C and the shift group centroid B is smaller than one-fifth or one-tenth of an outer diameter of the image shake correction lens unit 410. In addition, the shift group centroid B used here is a centroid of the shift group in a case where the shift barrel 401 moving in the direction orthogonal to the optical axis relative to the base member 402, the image shake correction lens unit 410, the driving coil 303p, and the driving coil 303y are assembled to be the shift group. As described above, as compared with the image shake correction lens unit 105 in the first exemplary embodiment, the image shake correction lens unit 410 in the second exemplary embodiment has a smaller diameter and a lighter weight. Therefore, the shift group centroid B gets closer to the driving coil than the shift group centroid A. The configuration illustrated in the second exemplary embodiment makes it possible to stably bias the shift barrel 401 toward the base member even in such a case.

In addition, as illustrated in FIG. 19, the resultant force C of the biasing force that acts on the shift barrel 401 from the second guide member through the second ball 308b and the second ball 308c acts on the point C inside the triangle B. Therefore, it is possible to stably bias the shift barrel 401.

By using the above-described configuration, it becomes possible to stably bias the shift barrel toward the base member even in a case where the centroid position of the shift group is close to the driving coil.

Effects Achieved by Second Exemplary Embodiment

An image shake correction unit smaller in size than the existing image shake correction unit is realizable also by the second exemplary embodiment as with the above-described first exemplary embodiment.

MODIFICATIONS

Although some exemplary embodiments of the present disclosure have been described above, the present disclosure is not limited to these exemplary embodiments, and may be variously modified and alternated within the scope of the present disclosure.

For example, each of the above-described exemplary embodiments adopts the configuration using the tension spring as the biasing member. Alternatively, a configuration in which the guide member and the shift barrel are biased toward the base member by magnetic biasing may be adopted instead of the configuration using the tension spring. Further, a position sensor that detects the position of the shift barrel has not been described; however, a position sensor such as a Hall integrated circuit (IC), and a magnet may be provided on the shift barrel or the base member.

In addition, instead of providing the first guide groove in the shift barrel, a third guide member including the first guide groove may be provided between the shift barrel and the first guide member in order to prevent bruise of the groove if a drop impact is made.

Moreover, although the configuration in which the magnet pair is provided above and below each of the driving coils 303p and 303y has been disclosed in each of the above-described exemplary embodiments, the present disclosure is not limited to such a configuration. The magnet pair may be provided only on one of the first guide member 310 side and the base member 302 side with respect to the driving coils 303p and 303y.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-254217, filed Dec. 27, 2016, which is hereby incorporated by reference herein in its entirety.

What is claimed is:

1. An image shake correction unit, comprising:
   a base member;
   a yoke;
   a lens holding member that holds a lens unit and is movable in a direction orthogonal to an optical axis of the lens unit;
   a driving unit configured to move the lens holding member in the direction orthogonal to the optical axis;
   a rotation suppression unit that is provided on a side opposite to a side of the base member relative to the lens holding member in an optical axis direction of the lens unit, and is configured to suppress rotation of the lens holding member around the optical axis; and
   a biasing member configured to bias the lens holding member toward the base member in the optical axis direction, wherein
   at least a part of the driving unit and at least a part of the rotation suppression unit are located on a circumference of a circle centering on the optical axis in a case where the image vibration correction unit is viewed from the optical axis direction, and
   one end of the biasing member in the optical axis direction is connected to the rotation suppression unit without connecting to the lens holding member, and the other end of the biasing member in the optical axis direction is connected to the base member.

2. The image shake correction unit according to claim 1, wherein
   the driving unit includes a first driving unit that moves the lens holding member in a first direction orthogonal to the optical axis,
   the yoke includes a first yoke and a second yoke that are provided at positions different from each other in the optical axis direction,
   the first driving unit includes a first coil, a first magnet pair, and a second magnet pair, the first coil being provided on the lens holding member, the first magnet pair being provided on a side of the base member relative to the first coil, and the second magnet pair being provided on a side opposite to the side of the base member relative to the first coil.

3. The image shake correction unit according to claim 2, wherein at least a part of the rotation suppression unit is provided in a region that has a width equal to a distance from the first yoke to the second yoke in a case where the image shake correction unit is viewed from the direction orthogonal to the optical axis.

4. The image shake correction unit according to claim 1, wherein
   the lens holding member is movable in a first direction and a second direction that are orthogonal to the optical axis, and
   the rotation suppression unit includes a first guide member and a second guide member, the first guide member allowing the lens holding member to move in the second direction and being provided on a side opposite to the side of the base member relative to the lens holding member, the second guide member allowing the lens holding member to move in the first direction and being provided on a side opposite to the side of the lens holding member relative to the first guide member.

5. The image shake correction unit according to claim 4, wherein each of the first and second guide members has a shape not overlapping with an entire circumference of the circle in a case where the image shake correction unit is viewed from the optical axis direction.

6. The image shake correction unit according to claim 4, wherein
   the lens holding member is allowed to move in the second direction relative to the first guide member, and is suppressed in movement in the first direction relative to the first guide member, and
   the first guide member is allowed to move in the first direction relative to the second guide member and is suppressed in movement in the second direction relative to the second guide member.

7. The image shake correction unit according to claim 4, wherein the one end of the biasing member is provided on the second guide member.

8. The image shake correction unit according to claim 6, wherein
   the lens holding member includes a first guide groove extending in the second direction,
   the first guide member includes a second guide groove extending in the second direction and a third guide groove extending in the first direction,
   the second guide member includes a fourth guide groove extending in the first direction,
   a plurality of first rolling members are provided between the lens holding member and the base member,
   a part of a plurality of second rolling members is provided between the first guide groove and the second guide groove, and
   a part of a plurality of third rolling members is provided between the third guide groove and the fourth guide groove.

9. The image shake correction unit according to claim 6, further comprising a third guide member that includes a first guide groove extending in the second direction and is provided between the lens holding member and the first guide member, wherein
   the first guide member includes a second guide groove extending in the second direction and a third guide groove extending in the first direction,
   the second guide member includes a fourth guide groove extending in the first direction,
   a plurality of first rolling members are provided between the lens holding member and the base member,
   a part of a plurality of second rolling members is provided between the first guide groove and the second guide groove, and a part of a plurality of third rolling members is provided between the third guide groove and the fourth guide groove.

10. The image shake correction unit according to claim 9, wherein a second rolling member different from some of the plurality of second rolling members is provided between the first guide member and the base member.

11. The image shake correction unit according to claim 9, wherein a third rolling member different from some of the plurality of third rolling members is provided between the first guide member and the second guide member.

12. The image shake correction unit according to claim 1, wherein the driving unit is provided on one side of a straight line and the rotation suppression unit is provided on the other side of the straight line, the straight line passing through the lens unit and through positions different from that of the driving unit and the rotation suppression unit in a case where the image shake correction unit is viewed from the optical axis direction.

13. The image shake correction unit according to claim 12, wherein the biasing member includes a first biasing member and a second biasing member that are provided at positions different from each other, on the opposite side.

14. The image shake correction unit according to claim 13, wherein
the biasing member further includes a third biasing member provided on one side, and
the third biasing member has a biasing force smaller than biasing force of the first biasing member and biasing force of the second biasing member.

15. A lens apparatus comprising:
the image shake correction unit according to claim 1; and
a lens barrel holding the image shake correction unit.

16. An image pickup apparatus comprising:
the lens apparatus according to claim 15; and
an image sensor which receives light from the lens apparatus.

17. The image shake correction unit according to claim 2, wherein
the driving unit includes a second driving unit that moves the lens holding member in a second direction orthogonal to the optical axis,
the second driving unit includes a second coil, a third magnet pair, and a fourth magnet pair, the second coil being provided on the lens holding member, the third magnet pair being provided on a side of the base member relative to the second coil, and the fourth magnet pair being provided on a side opposite to the side of the base member relative to the second coil.

18. The image shake correction unit according to claim 17, wherein the first and second magnet pairs, the third and fourth magnet pairs, and the first and second coils are provided between the first yoke and the second yoke.

19. An image shake correction unit, comprising:
a base member;
a yoke;
a lens holding member that holds a lens unit and is movable in a direction orthogonal to an optical axis of the lens unit;
a driving unit configured to move the lens holding member in the direction orthogonal to the optical axis;
a rotation suppression unit that is provided on a side opposite to a side of the base member relative to the lens holding member, and is configured to suppress rotation of the lens holding member around the optical axis; and
a biasing member configured to bias the lens holding member toward the base member in a direction of the optical axis, wherein
the driving unit and the rotation suppression unit are disposed such that at least a part of the driving unit and at least a part of the rotation suppression unit are located on a circumference of a circle that has a predetermined radius centering on the optical axis in a case where the image vibration correction unit is viewed from the direction of the optical axis,
the biasing member has one end provided on the rotation suppression unit and the other end provided on the base member,
the lens holding member is movable in a first direction and a second direction that are orthogonal to the optical axis, and
the rotation suppression unit includes a first guide member and a second guide member, the first guide member allowing the lens holding member to move in the second direction and being provided on a side opposite to the side of the base member relative to the lens holding member, the second guide member allowing the lens holding member to move in the first direction and being provided on a side opposite to the side of the lens holding member relative to the first guide member.

20. An image shake correction unit, comprising:
a base member;
a yoke;
a lens holding member that holds a lens unit and is movable in a direction orthogonal to an optical axis of the lens unit;
a driving unit configured to move the lens holding member in the direction orthogonal to the optical axis;
a rotation suppression unit that is provided on a side opposite to a side of the base member relative to the lens holding member, and is configured to suppress rotation of the lens holding member around the optical axis; and
a biasing member configured to bias the lens holding member toward the base member in a direction of the optical axis, wherein
the driving unit and the rotation suppression unit are disposed such that at least a part of the driving unit and at least a part of the rotation suppression unit are located on a circumference of a circle that has a predetermined radius centering on the optical axis in a case where the image vibration correction unit is viewed from the direction of the optical axis,
the biasing member has one end provided on the rotation suppression unit and the other end provided on the base member, and
the driving unit is provided on one side of a straight line and the rotation suppression unit is provided on the other side of the straight line, the straight line passing through the lens unit and through positions different from that of the driving unit and the rotation suppression unit in a case where the image shake correction unit is viewed from the direction of the optical axis.

* * * * *